(12) United States Patent
Zarraga et al.

(10) Patent No.: US 11,194,415 B2
(45) Date of Patent: *Dec. 7, 2021

(54) METHOD AND APPARATUS FOR INDIRECT FORCE AWARE TOUCH CONTROL WITH VARIABLE IMPEDANCE TOUCH SENSOR ARRAYS

(71) Applicant: Sensel, Inc., Sunnyvale, CA (US)

(72) Inventors: John Aaron Zarraga, San Francisco, CA (US); Alexander Meagher Grau, Durham, NC (US); Bethany Noel Haniger, Los Gatos, CA (US); Bradley James Bozarth, Moore, SC (US); Brogan Carl Miller, Mountain View, CA (US); Ilya Daniel Rosenberg, Mountain View, CA (US); James Frank Thomas, Danville, CA (US); Mark Joshua Rosenberg, Sunnyvale, CA (US); Peter Hans Nyboer, San Jose, CA (US); Reuben Eric Martinez, Gilroy, CA (US); Scott Gregory Isaacson, Mountain View, CA (US); Stephanie Jeanne Oberg, Sunnyvale, CA (US); Timothy James Miller, Half Moon Bay, CA (US); Tomer Moscovich, San Francisco, CA (US); Yibo Yu, Santa Clara, CA (US)

(73) Assignee: Sensel, Inc., Sunnyvale, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/724,541

(22) Filed: Dec. 23, 2019

(65) Prior Publication Data
US 2020/0218418 A1 Jul. 9, 2020

Related U.S. Application Data

(60) Provisional application No. 62/787,898, filed on Jan. 3, 2019.

(51) Int. Cl.
*G06F 3/041* (2006.01)
*G06F 3/0488* (2013.01)

(52) U.S. Cl.
CPC ...... *G06F 3/04144* (2019.05); *G06F 3/04166* (2019.05); *G06F 3/04883* (2013.01);
(Continued)

(58) Field of Classification Search
CPC ............ G06F 3/04883; G06F 3/04166; G06F 3/04144; G06F 2203/04808; G06F 2203/04104
See application file for complete search history.

(56) References Cited

U.S. PATENT DOCUMENTS 9,459,746 B2   10/2016   Rosenberg et al.
9,465,477 B2   10/2016   Rosenberg et al.
(Continued)

OTHER PUBLICATIONS

Final Office Action received for U.S. Appl. No. 16/519,319 dated Sep. 16, 2020, 17 pages.
(Continued)

*Primary Examiner* — Abbas I Abdulselam
(74) *Attorney, Agent, or Firm* — Amin, Turocy & Watson, LLP

(57) ABSTRACT

The present invention relates to touch sensor systems and methods incorporating an interpolated variable impedance touch sensor array and specifically to such systems and methods for indirect force-aware touch control. An exemplary method for receiving an adjustment gesture formed on or about a plurality of sensor panels on a plurality of faces of a device includes detecting two or more touches at a first time at the plurality of sensor panels and determining that the touches at the first time are arranged in a pattern corresponding to a predetermined gesture. The method further includes determining a relative pressure between the touches, associating the gesture with a user interface element
(Continued)

(that accepts an adjustment input based on the relative pressure between the two or more touches) and providing an input to the user interface element based on the gesture and relative pressure between the touches.

20 Claims, 16 Drawing Sheets

(52) U.S. Cl.
CPC .............. *G06F 2203/04104* (2013.01); *G06F 2203/04808* (2013.01)

(56) References Cited

U.S. PATENT DOCUMENTS

| | | | |
|---|---|---|---|
| 9,746,964 | B2 | 8/2017 | Rosenberg et al. |
| 9,864,460 | B2 | 1/2018 | Rosenberg et al. |
| 9,864,461 | B2 | 1/2018 | Rosenberg et al. |
| 10,073,565 | B2 | 9/2018 | Rosenberg et al. |
| 10,088,947 | B2 | 10/2018 | Rosenberg et al. |
| 10,254,943 | B2 | 4/2019 | Jubner et al. |
| 10,891,050 | B2 * | 1/2021 | Zarraga .................. G01L 1/146 |
| 2008/0246726 | A1 | 10/2008 | Gettemy |
| 2009/0167722 | A1 * | 7/2009 | Villain .................... G06F 3/011 345/174 |
| 2009/0256817 | A1 | 10/2009 | Perlin et al. |
| 2011/0284304 | A1 | 11/2011 | Van Schoiack |
| 2012/0001861 | A1 | 1/2012 | Townsend et al. |
| 2012/0056837 | A1 | 3/2012 | Park et al. |
| 2013/0120302 | A1 | 5/2013 | Kang et al. |
| 2013/0307799 | A1 | 11/2013 | Hauf |
| 2014/0071077 | A1 | 3/2014 | Kang |
| 2014/0253440 | A1 | 9/2014 | Karakotsios et al. |
| 2014/0267100 | A1 | 9/2014 | Sohn et al. |
| 2014/0313163 | A1 | 10/2014 | Coni et al. |
| 2014/0317722 | A1 | 10/2014 | Tartz et al. |
| 2015/0077364 | A1 | 3/2015 | Parthasarathy et al. |
| 2015/0091858 | A1 | 4/2015 | Rosenberg et al. |
| 2015/0091859 | A1 | 4/2015 | Rosenberg et al. |
| 2015/0339001 | A1 | 11/2015 | Zirkl et al. |
| 2016/0313801 | A1 | 10/2016 | Wagner et al. |
| 2017/0035329 | A1 | 2/2017 | Gavish |
| 2017/0038910 | A1 | 2/2017 | Lee |
| 2017/0185289 | A1 | 6/2017 | Kim et al. |
| 2017/0285848 | A1 | 10/2017 | Rosenberg et al. |
| 2017/0336891 | A1 | 11/2017 | Rosenberg et al. |
| 2018/0113512 | A1 | 4/2018 | Kang et al. |
| 2019/0079655 | A1 | 3/2019 | Park |

OTHER PUBLICATIONS

Non-Final Office Action received for U.S. Appl. No. 16/384,331 dated Apr. 16, 2020, 30 pages.
Non-Final Office Action received for U.S. Appl. No. 16/519,319 dated May 18, 2020, 31 pages.
Non-Final Office Action received for U.S. Appl. No. 16/568,691 dated May 5, 2020, 39 pages.
International Search Report and Written Opinion received for PCT Application Serial No. PCT/US2019/068287 dated Apr. 24, 2020, 13 pages.
International Search Report and Written Opinion received for PCT Application Serial No. PCT/US2019/068284 dated Mar. 13, 2020, 08 pages.
Lo et al.,"Bendy: An Exploration into Gaming with Mobile Flexible Devices" In: Carleton University, Feb. 20, 2020, 20 pages.
Non-Final Office Action received for U.S. Appl. No. 16/414,419 dated Jun. 11, 2020, 22 pages.
Office Action received for U.S. Appl. No. 16/724,548 dated Mar. 3, 2021, 46 pages.
Non Final Office Action received for U.S. Appl. No. 17/113,818 dated Aug. 17, 2021, 32 pages.
Non Final Office Action received for U.S. Appl. No. 17/226,522 dated Aug. 27, 2021, 30 pages.
Final Office Action received for U.S. Appl. No. 16/724,548 dated Aug. 11, 2021, 32 pages.
International Preliminary Report on Patentability received for PCT Application Serial No. PCT/US2019/068284 dated Jul. 8, 2021, 07 pages.
International Preliminary Report on Patentability received for PCT Application Serial No. PCT/US2019/068287 dated Jul. 15, 2021, 6 pages.
Non Final Office Action received for U.S. Appl. No. 17/237,224 dated Sep. 30, 2021, 22 pages.

* cited by examiner

METHOD AND APPARATUS FOR INDIRECT FORCE AWARE TOUCH CONTROL WITH VARIABLE IMPEDANCE TOUCH SENSOR ARRAYS

CROSS-REFERENCE TO RELATED APPLICATIONS

This application claims priority to U.S. Provisional Patent Application No. 62/787,898 titled METHOD AND APPARATUS FOR INDIRECT FORCE AWARE TOUCH CONTROL WITH VARIABLE IMPEDANCE TOUCH SENSOR ARRAYS and filed on Jan. 3, 2019, the disclosure of which is hereby incorporated herein by reference in its entirety.

INTRODUCTION

The present invention relates to touch sensor systems and methods incorporating an interpolated variable impedance touch sensor array and specifically to such systems and methods for indirect force-aware touch control. The systems and methods disclosed herein utilize a touch sensor array configured to detect proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

The gesture recognition systems and methods using variable impedance array sensors include sensors disclosed in the following applications, the disclosures of which are hereby incorporated by reference in their entirety: U.S. patent application Ser. No. 15/599,365 titled SYSTEM FOR DETECTING AND CONFIRMING A TOUCH INPUT filed on May 18, 2017; U.S. patent application Ser. No. 15/653,856 titled TOUCH SENSOR DETECTOR SYSTEM AND METHOD filed on Jul. 19, 2017; U.S. patent application Ser. No. 15/271,953 titled DIAMOND PATTERNED TOUCH SENSOR SYSTEM AND METHOD filed on Sep. 21, 2016; U.S. patent application Ser. No. 14/499,090 titled CAPACITIVE TOUCH SENSOR SYSTEM AND METHOD filed on Sep. 27, 2014 and issued as U.S. Pat. No. 9,459,746 on Oct. 4, 2016; U.S. patent application Ser. No. 14/499,001 titled RESISTIVE TOUCH SENSOR SYSTEM AND METHOD filed on Sep. 26, 2014 and issued as U.S. Pat. No. 9,465,477 on Oct. 11, 2016; U.S. patent application Ser. No. 15/224,003 titled SYSTEMS AND METHODS FOR MANIPULATING A VIRTUAL ENVIRONMENT filed on Jul. 29, 2016 and issued as U.S. Pat. No. 9,864,461 on Jan. 9, 2018; U.S. patent application Ser. No. 15/223,968 titled SYSTEMS AND METHODS FOR MANIPULATING A VIRTUAL ENVIRONMENT filed on Jul. 29, 2016 and issued as U.S. Pat. No. 9,864,460 on Jan. 9, 2018; U.S. patent application Ser. No. 15/470,669 titled SYSTEM AND METHOD FOR DETECTING AND CHARACTERIZING FORCE INPUTS ON A SURFACE filed on Mar. 27, 2017; and U.S. patent application Ser. No. 15/476,732 titled HUMAN-COMPUTER INTERFACE SYSTEM filed on Oct. 5, 2017.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

Figure 1:
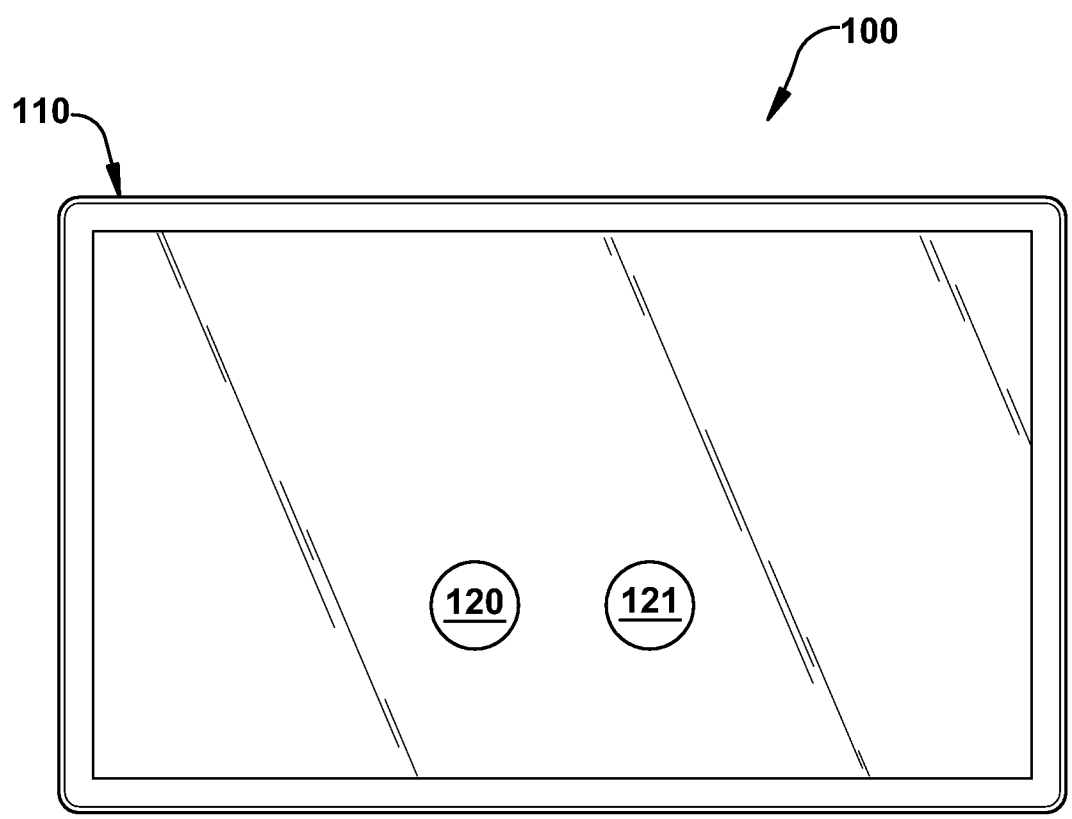
FIG. 1 illustrates a system using an exemplary interpolated variable impedance sensor array for gesture recognition.

The present invention relates to touch sensor systems and methods incorporating an interpolated variable impedance touch sensor array and specifically to such systems and methods for indirect force-aware touch control. The systems and methods disclosed herein utilize a touch sensor array configured to detect proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

An exemplary method for receiving an adjustment gesture formed on or about a plurality of sensor panels on a plurality of faces of a device includes detecting two or more touches at a first time at the plurality of sensor panels and determining that the touches at the first time are arranged in a pattern corresponding to a predetermined gesture. The method further includes determining a relative pressure between the touches, associating the gesture with a user interface element (that accepts an adjustment input based on the relative pressure between the two or more touches) and providing an input to the user interface element based on the gesture and relative pressure between the touches.

Another exemplary embodiment includes a laptop touchpad system for detecting a continuous pressure curve for a touch. The touchpad system includes a plurality of physical variable impedance array (VIA) columns connected by interlinked impedance columns and a plurality of physical VIA rows connected by interlinked impedance rows. The touchpad system also includes a plurality of column drive sources connected to the interlinked impedance columns and to the plurality of physical VIA columns through the interlinked impedance columns and a plurality of row sense sinks connected to the interlinked impedance rows and to the plurality of physical VIA rows through the interlinked impedance rows. The touchpad system further includes a processor configured to interpolate the continuous pressure curve in the physical VIA columns and physical VIA rows from an electrical signal from the plurality of column drive sources sensed at the plurality of row sense sinks.

In the touchpad system, the processor may also be configured to detect two or more touches at a first time, determine that the two or more touches at the first time are arranged in a pattern corresponding to a predetermined gesture, determine a relative pressure between the two or more touches from the electrical signal from the plurality of column drive sources sensed at the plurality of row sense sinks, and associate the continuous pressure curve with a user interface (UI) element, the UI element accepting an adjustment input based on the relative pressure between the two or more touches, and provide a confirming input to the UI element based on the relative pressure between the two or more touches.

Figure 2:
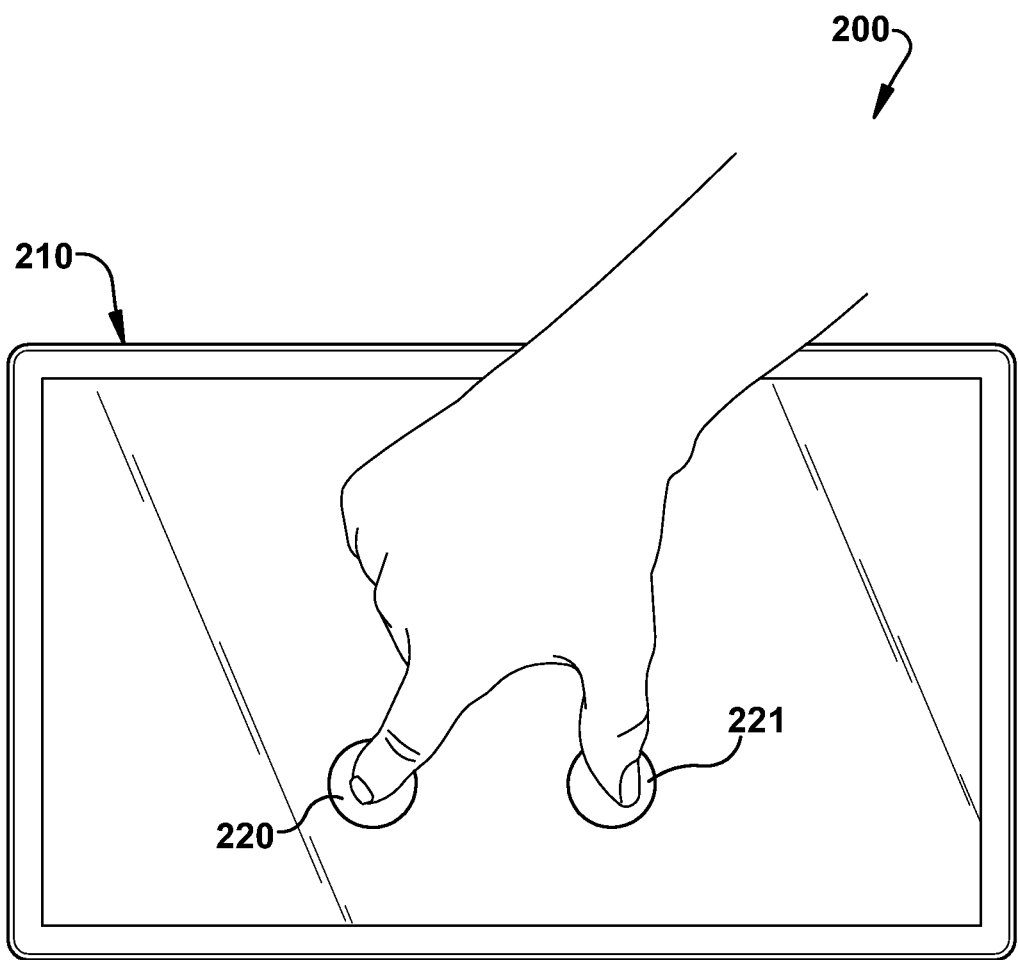
FIG. 2 illustrates a system using an exemplary interpolated variable impedance sensor array for gesture recognition.

FIG. 1 illustrates a system 100 using an exemplary interpolated variable impedance sensor array for gesture recognition and a touch interface 110 using the exemplary interpolated variable impedance sensor array. The touch interface 110 could be a touchscreen or trackpad or the like and could be integral, attached, or detached from a computer or computing device with a UI. In one embodiment, a processor communicatively coupled to the sensor array 110 is programmed to receive a gesture input formed on or about the face of the sensor array 110. The processor may be programmed to detect two or more touches on the sensor array 110. Two exemplary touches 120, 121 are illustrated as circles in FIG. 1. The circles 120, 121 represent points at which a user has contacted the sensor array 110. In one embodiment, the processor is programmed to determine that the two or more touches are arranged in a pattern corresponding to a predetermined pattern. For example, the processor may determine the distance (D) between the two points 120, 121. Whether the distance (D) is greater than or less than some threshold may be used to determine if the touch points 120, 121 correspond to a given pattern. For example, as shown in FIG. 2, the two points 220, 221 may be required to be less than a threshold distance that is within the span of an index finger to a thumb as shown. This way, other types of touches could be rejected. In FIG. 2, the sensor array 210 is only slightly larger than a hand. This would be typical of a mobile device touchscreen or an inset touchpad.

Figure 3:
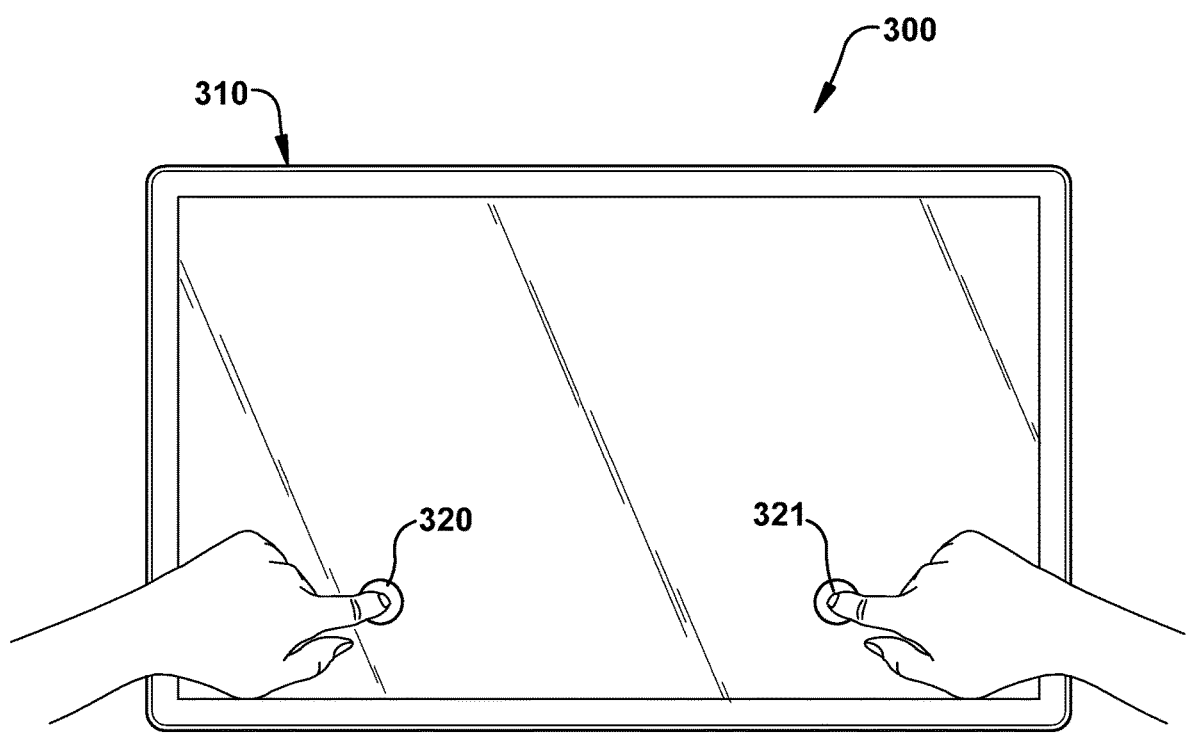
FIG. 3 illustrates a system using an exemplary interpolated variable impedance sensor array for gesture recognition.
Figure 4:
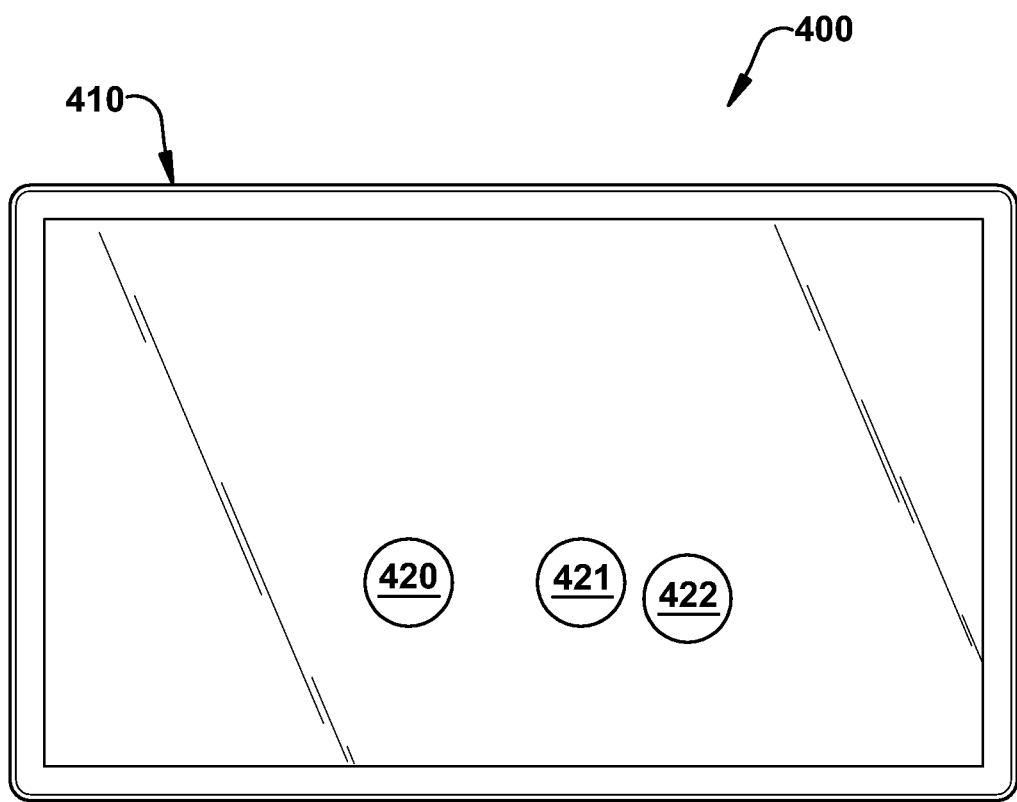
FIG. 4 illustrates a system using an exemplary interpolated variable impedance sensor array for gesture recognition.

Alternatively, as shown in FIG. 3, the two points 320, 321 may be required to be greater than a threshold distance that is greater than the span between fingers and/or the thumb of one hand. This way, types of touches from one hand could be rejected. In FIG. 3, the sensor array 310 is multiple hand-spans in each direct. This would be typical of a large touch interface such as large touchscreen monitors or tabletop touch interfaces. Further, the processor may be programmed to look for specific combinations of touch points within certain distances of each other. For example, in FIG. 4, touches 420, 421, 422 correspond to a thumb, index finger, and middle finger respectively. The processor may be programmed to determine the relative distance between each of the touches 420, 421, 422 and determine if the distance meets one or more threshold criteria. This way, the processor may be programmed to recognize patterns created by various combinations of finger touches on the sensor array 410.

Figure 5:
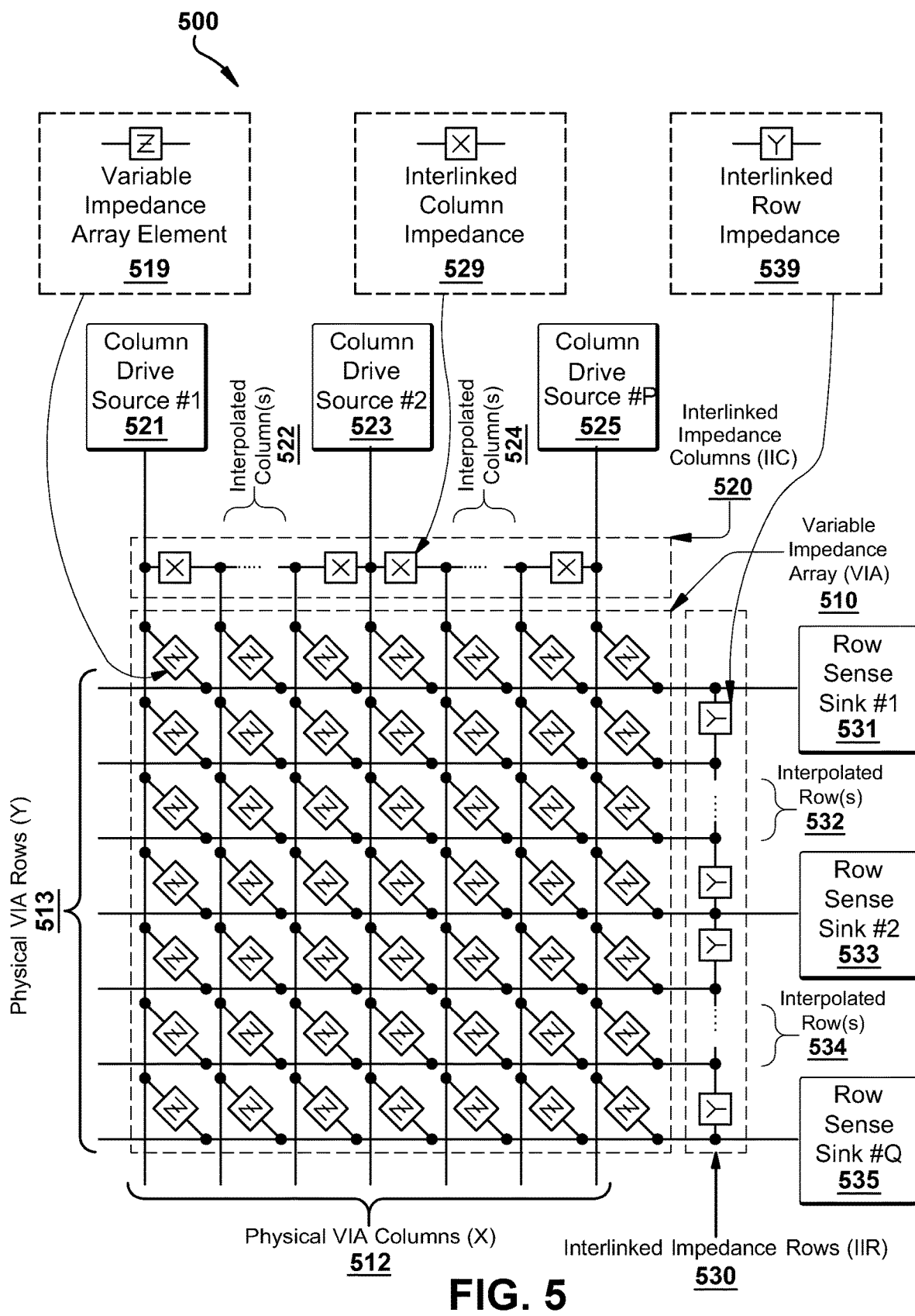
FIG. 5 illustrates an exemplary variable impedance touch sensor array with interlinked impedance columns and interlinked impedance rows.
Figure 6:
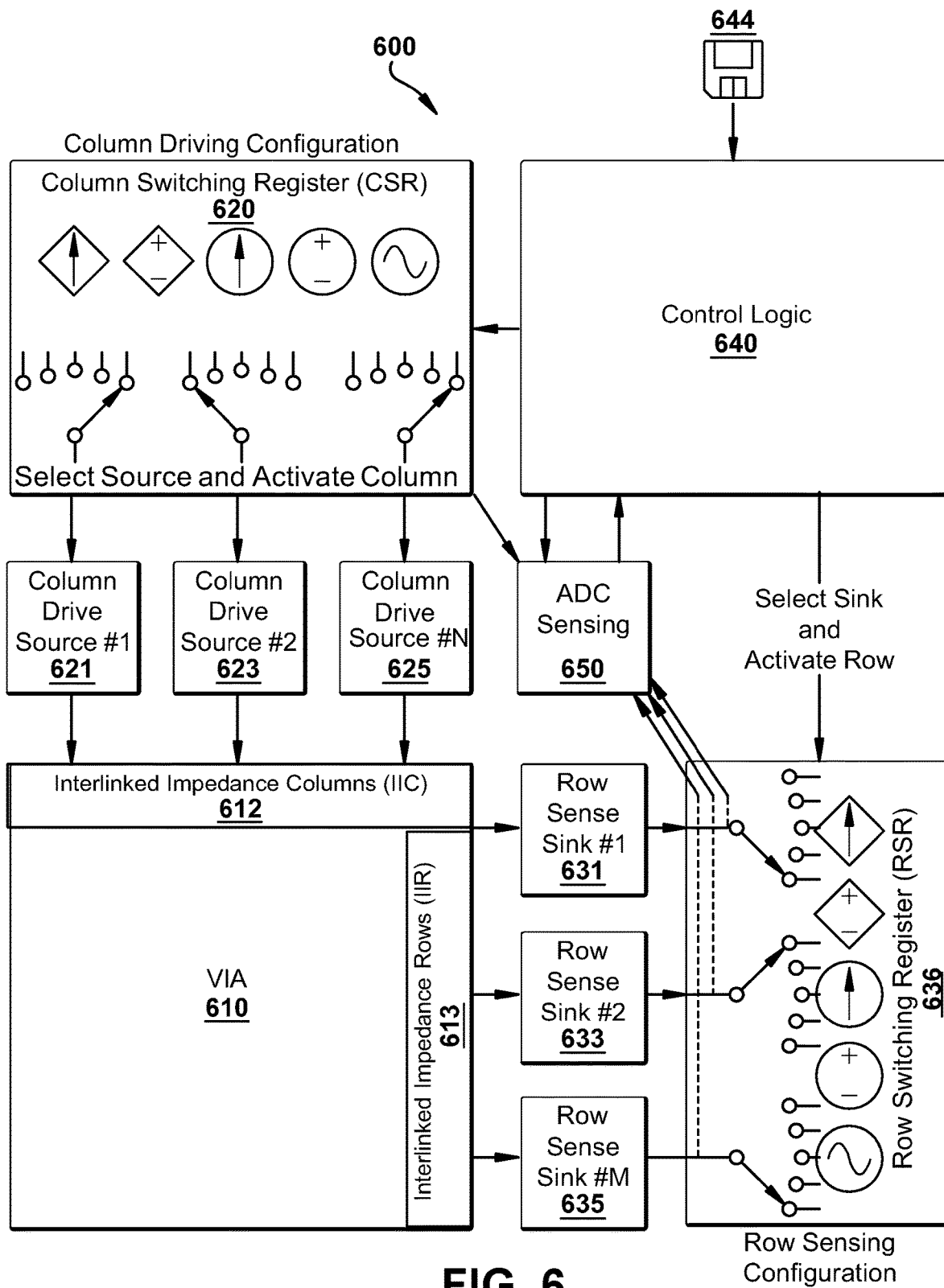
FIG. 6 illustrates an exemplary column switching register, row switching register, interlinked impedance column, and interlinked impedance row of an exemplary variable impedance touch sensor array.
Figure 7:
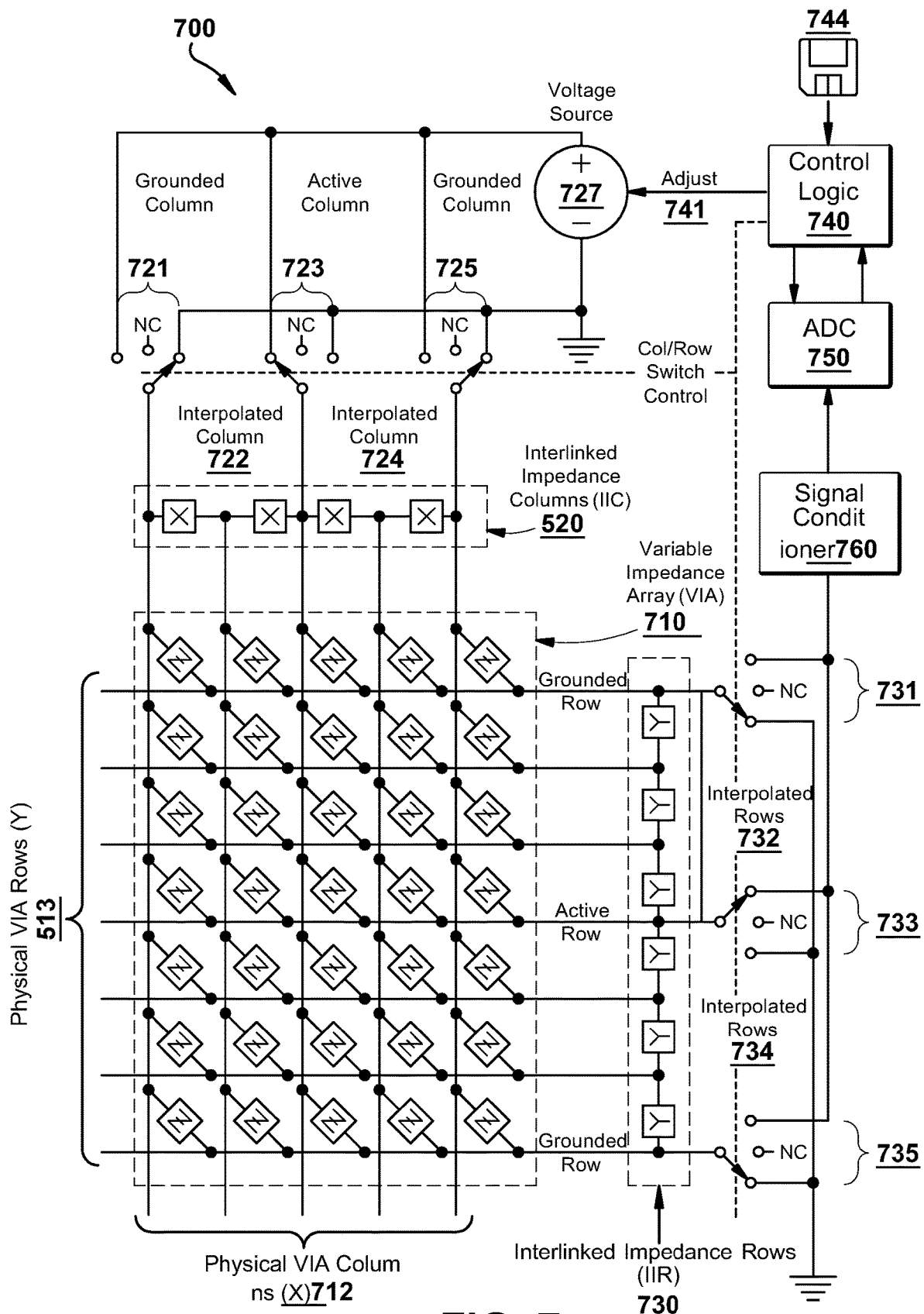
FIG. 7 illustrates an exemplary variable impedance touch sensor array.

FIGS. 5-7 illustrate an exemplary variable impedance touch sensor array 500, 600, 700 including interlinked impedance columns and interlinked impedance rows as well as an exemplary column switching register, row switching register, interlinked impedance column, and interlinked impedance row. FIG. 5 illustrates an exemplary variable impedance array 510, interlinked impedance columns 520, and interlinked impedance rows 530. Here the variable impedance array 510 includes columns 512 and rows 513 of an array in which individual variable impedance array elements 519 may interconnect within the row/column cross points of the array. These individual variable impedance array elements 519 may comprise active and/or passive components based on the application context, and include any combination of resistive, capacitive, and inductive components. Thus, the variable impedance array 510 array impedance elements are depicted generically in this diagram as generalized impedance values Z.

The physical variable impedance array columns 512 and variable impedance array rows 513 are connected via interlinked impedance columns 520 and interlinked impedance rows 530, respectively. The interlinked impedance columns 520 and interlinked impedance rows 530 are configured to reduce the number of columns and rows that are connected to the column drive sources 521, 523, 525 and the row sense sinks 531, 533, 535. As such, the combination of the interlinked impedance columns 520 and interlinked impedance rows 530 will reduce the external components necessary to interface to the variable impedance array columns 512 and variable impedance array rows 513. Within the context of the present invention, the number of interlinked impedance columns 520 interconnects will be configured to allow the reduction of the number of column drive sources 521, 523, 525 to less than the number of physical variable impedance array columns 512 (thus the number of external interlinked impedance columns is typically less than the number of internal interlinked impedance columns columns), and the interlinked impedance rows 530 interconnects will be configured to allow the reduction of the number of row sense sinks 531, 533, 535 to less than the number of physical variable impedance array rows 513 (thus the number of external interlinked impedance rows is typically less than the number of interlinked impedance rows rows). This reduction is achieved by having one or more interlinked impedance columns 520 elements 529 in series between each variable impedance array physical column 512 and one or more interlinked impedance rows 530 elements 539 between each variable impedance array physical row 513. Thus, the XXY variable impedance array sensor 510 is translated to an electrical interface only requiring P column drivers and Q row sensors. The present invention constrains P≤X and Q≤Y with many preferred embodiments satisfying the relations X/P≥2 or Y/Q≥2.

Note that within the context of these preferred embodiments, there may be circumstances where the interlinked impedance columns may incorporate a plurality of interlinked impedances with the interlinked impedance rows incorporating a singular interlinked impedance element, and circumstances where the interlinked impedance columns may incorporate a singular interlinked impedance element with the interlinked impedance rows incorporating a plurality of interlinked impedance elements.

The interlinked impedance columns 520 impedance elements 529 are configured to connect individual variable impedance array columns 512. These interlinked impedance columns 520 impedance elements 529 may comprise active and/or passive components based on the application context and include any combination of resistive, capacitive, and inductive components. Thus, the interlinked impedance columns 520 impedance elements 529 are depicted generically in this diagram as generalized impedance values X. As depicted in the diagram, the individual variable impedance array columns may either be directly driven using individual column drive sources 521, 523, 525 or interpolated 522, 524 between these directly driven columns.

The interlinked impedance rows 530 impedance elements 539 are configured to connect individual variable impedance array rows 513. These interlinked impedance rows 530 impedance elements 539 may comprise active and/or passive components based on the application context and include any combination of resistive, capacitive, and inductive components. Thus, the interlinked impedance rows 530 impedance elements 539 are depicted generically in this diagram as generalized impedance values Y. As depicted in the diagram, the individual variable impedance array rows may either be directly sensed using individual row sense sinks 531, 533, 535 or interpolated 532, 534 between these directly sensed rows.

The column drive sources 521, 523, 525 are generically illustrated as being independent in this diagram but may be combined in some configurations utilizing a series of switches controlled by a column switching register that defines the type of column drive source to be electrically coupled to each column that is externally accessible to the variable impedance array sensors 510. Variations of AC/DC excitation, voltage sources, open circuits, current sources, and other electrical source driver combinations may be utilized as switched configurations for the column drive sources 521, 523, 525. The column switching register may be configured to both select the type of electrical source to be applied to the variable impedance array sensors 510 but also its relative amplitude/magnitude.

The row sense sinks 531, 533, 535 are generically illustrated as being independent in this diagram but may be combined in some configurations utilizing a series of switches controlled by a row switching register that defines the type of row sense sinks to be electrically coupled to each row that is externally accessible to the variable impedance array sensors 510. Variations of AC/DC excitation, voltage sources, open circuits, current sources, and other electrical sense sink combinations may be utilized as switched configurations for the row sense sinks 531, 533, 535. The row switching register may be configured to both select the type of electrical sink to be applied to the variable impedance array sensors 510, but also its relative amplitude/magnitude.

Further detail of the column switching register and row switching register column/row source/sink operation is depicted in FIG. 6 (600) wherein the variable impedance array 610 is interfaced via the use of the interlinked impedance columns 612 and interlinked impedance rows 613 impedance networks to column drive sources 621, 623, 625 and row sense sinks 631, 633, 635, respectively. The column switching registers 620 may comprise a set of latches or other memory elements to configure switches controlling the type of source drive associated with each column drive source 621, 623, 625, the amplitude/magnitude of the drive source, and whether the drive source is activated. Similarly, the row switching registers 630 may comprise a set of latches or other memory elements to configure switches controlling the type of sense sink associated with each row sense sink 631, 633, 635, the amplitude/magnitude of the sink, and whether the sink is activated.

As mentioned previously, the interlinked impedance columns 612 and interlinked impedance rows 613 impedance networks may comprise a wide variety of impedances that may be static or actively engaged by the configuration of the column switching register 620 and row switching register 630, respectively. Thus, the column switching register 620 and row switching register 630 may be configured in some preferred embodiments to not only stimulate/sense the variable impedance array 610 behavior, but also internally configure the interlinked nature of the variable impedance array 610 by reconfiguring the internal column cross-links and the internal row cross-links. All this behavior can be determined dynamically by control logic 640 that may include a microcontroller or other computing device executing machine instructions read from a computer-readable medium 644. Within this context, the behavior of the analog-to-digital (ADC) converter 650 may be controlled in part by the configuration of the column switching register 620 and/or row switching register 630, as well as the control logic 640. For example, based on the configuration of the column switching register 620 and row switching register 630, the ADC 650 may be configured for specific modes of operation that are compatible with the type of sensing associated with the column switching register 620/row switching register 630 setup.

FIG. 7 illustrates 700 an exemplary variable impedance array sensor 710 in which the interlinked impedance columns 720 form a reduced electrical interface to the physical variable impedance array sensor columns 712 that comprise the variable impedance array sensor array 710. Similarly, the interlinked impedance rows 730 form a reduced electrical interface to the physical variable impedance array sensor rows 713 that comprise the variable impedance array sensor array 710. Note in this example that the number of physical variable impedance array columns 712 need not be the same as the number of physical variable impedance array rows 713. Furthermore, the number of column interpolation impedance components (X) serially connecting each column of the variable impedance array 710 need not be equal to the number of row interpolation impedance components (Y) serially connecting each row of the variable impedance array 710. In other words, the number of interpolated columns 722, 724 need not be equal to the number of interpolated rows 732, 734.

The control logic 740 provides information to control the state of the column switches 721, 723, 725 and row switches 731, 733, 735. The column switches 721, 723, 725 define whether the individual variable impedance array columns are grounded or driven to a voltage potential from a voltage source 727 that may in some embodiments be adjustable by the control logic 740 to allow on-the-fly adjustment 741 which can be used to compensate for potential non-linearities in the driving electronics. Similarly, the row switches 731, 733, 735 define whether an individual variable impedance array row is grounded or electrically coupled to the signal conditioner 760 and associated ADC 750.

In the configuration depicted in FIG. 7, the variable impedance array sensors 710 comprise uniformly two interpolating impedances between each column (X) and three interpolating impedances between each row (Y). This illustrates the fact that the number of interpolating columns need not equal the number of interpolating rows in a given variable impedance array. Furthermore, it should be noted that the number of interpolating columns need not be uniform across the variable impedance array, nor does the number of interpolating rows need be uniform across the variable impedance array. Each of these parameters may vary in number across the variable impedance array.

Note also that the variable impedance array sensors 710 need not have uniformity within the row or column interpolating impedances and that these impedances in some circumstances may be defined dynamically in number and/or value using MOSFETs or other transconductors. In this exemplary variable impedance array sensor segment, it can be seen that one column 723 of the array is actively driven while the remaining two columns 721, 725 are held at ground potential. The rows are configured such that one row 733 is being sensed by the signal conditioner 760/ADC combination 750 while the remaining rows 731, 735 are held at ground potential.

The processor is communicatively coupled to the sensor array shown in the Figures and is programmed to receive pressure information from the sensor array. As described above and in the incorporated references, the sensor array is designed to provide a continuous pressure gradient with a high-density array. In the interpolated variable impedance sensor array, interpolation blocks (interlinked impedance columns and interlinked impedance rows) allow the variable impedance array sensors to be scanned at a lower resolution. Because of the configuration of the interlinked impedance columns and interlinked impedance rows, the sensor hardware can properly down sample the signal in the variable impedance array (in a linear fashion). As a result, the scanned values in the lower-resolution array (touch sensor matrix) data structure) extracted from this variable impedance array sensor data resemble that of a linearly down sampled sensor response. This down sampling allows reconstruction of the positions, force, shape, and other characteristics of touches at the resolution of the variable impedance array (and even possibly at a higher resolution than the variable impedance array) in software.

As an example, on a variable impedance array sensor array constructed with 177 column electrodes and 97 row electrodes having a 1.25 mm pitch, it could be possible in theory to build electronics with 177 column drive lines and 97 row sense lines to support sensing of this entire variable impedance array. However, this would be prohibitive in terms of cost and it would be very difficult to route that many row and sense lines on a conventional printed circuit board in a space efficient manner. Additionally, this 177×97 variable impedance array sensor configuration would require scanning 177×97=17169 intersections, which with a low power microcontroller (such as an ARM M3) would result in a maximum scan rate of approximately 10 Hz (which is unacceptably slow for typical user interaction with a touch screen). Finally, assuming 16-bit ADC values, storage for these touch screen values would require 17169×2=34 KB of memory for a single frame, an excessive memory requirement for small microcontrollers that may only be configured with 32 KB of RAM. Thus, the use of conventional row/column touch sensor technology in this context requires a much more powerful processor and much more RAM, which would make this solution too expensive and complex to be practical for a consumer electronics application.

Rather than scanning the exemplary sensor array described above at the full 177×97 resolution, the system is configured to scan at a lower resolution but retain the accuracy and quality of the signal as if it had been scanned at 177×97. The drive electronics on a typical present invention embodiment for this sensor array would require only 45 column drivers and 25 row drivers. The interpolation circuit allows the system to scan the 177×97 array using only a complement of 45×25 electronics. This cuts the number of intersections that must be scanned down by a factor of 16 to 45×25=1125. This configuration allows scanning the sensor at 150 Hz and reduces memory consumption in a RAM-constrained microcontroller application context. Although the ability to resolve two touches that are 1.25 mm together (or to see exactly what is happening at each individual sensor element) is lost, it is still possible to track a touch at the full resolution of the variable impedance array sensors because of the linearity of the row/column interpolation performed by using the (interlinked impedance columns and interlinked impedance rows. In some embodiments the grid spacing is less than or equal to 5 mm.

The processor is programed to determine the relative pressure between the two more touches on the sensor array and to associate the pattern and pressure response with a gesture. The processor may provide input to a UI of an associated device based on the gesture, pattern, and/or pressure response.

Figure 8:
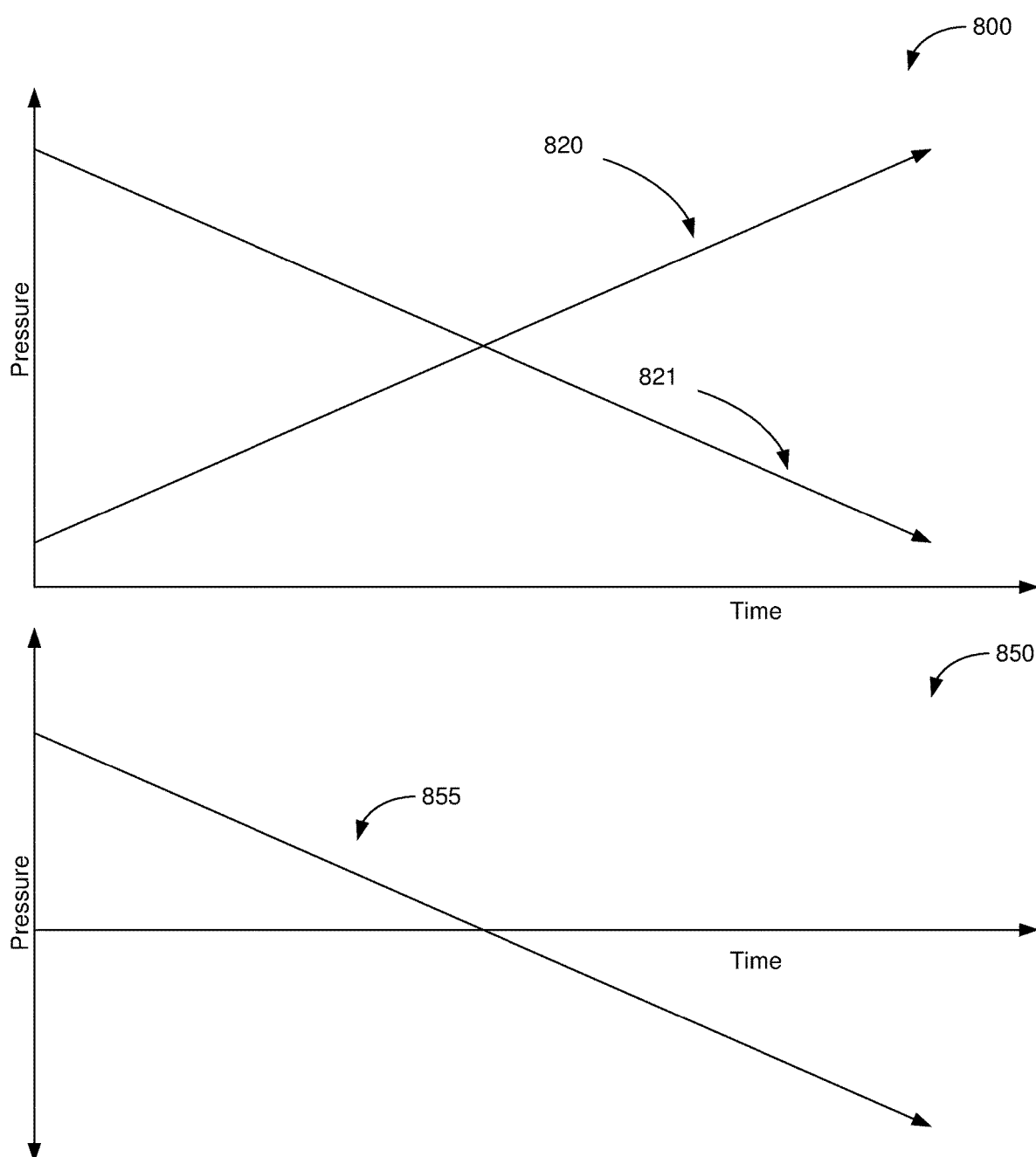
FIG. 8 shows exemplary pressure response curves for point sets in systems using exemplary interpolated variable impedance sensor arrays for gesture recognition.
Figure 9:
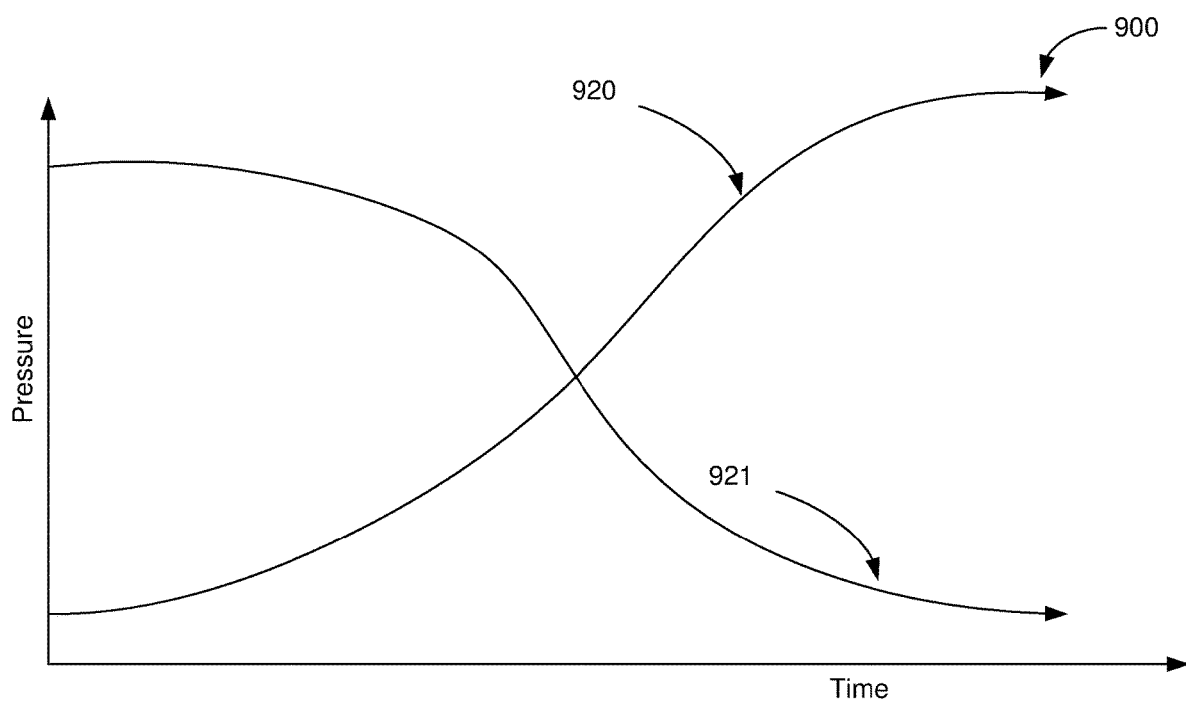
FIG. 9 shows exemplary pressure response curves for point sets in systems using exemplary interpolated variable impedance sensor arrays for gesture recognition.

In one embodiment, the processor is programmed to determine if a user is performing a see-saw pattern on the sensor array by touching the array at two or more points and varying the pressure at the two or more points in a rocking manner, that is increasing the pressure at one point while simultaneously decreasing the pressure at another point. For example, FIG. 8 shows exemplary pressure response curves 800 for the point sets 420/421, 520/521, 620/621 in FIGS. 4 through 6 respectively. The curve 820 corresponds to the pressure at touch 420, 520, 620 in FIGS. 4 through 6 respectively and the curve 821 corresponds to the pressure at touch 421, 521, 621 in FIGS. 4 through 6 respectively. The curves 820, 821 illustrate an exemplary pattern in which the pressure at one touch increases as the other decreases. The second graph 850 in FIG. 8 shows the curve 855 of the difference between the pressure of each touch in the touch point sets 420/421, 520/521, 620/621 in FIGS. 4 through 6 respectively. In this example, the difference between the two is uses. But the processor may use other mathematical combinations of the pressure data from the two or more points including ratios and multiples. The pressure response curves 820, 821 illustrated in FIG. 8 are only exemplary, and the disclosed systems may accommodate other pressure response curves such as those 920, 921 shown in FIG. 9.

Figure 10:
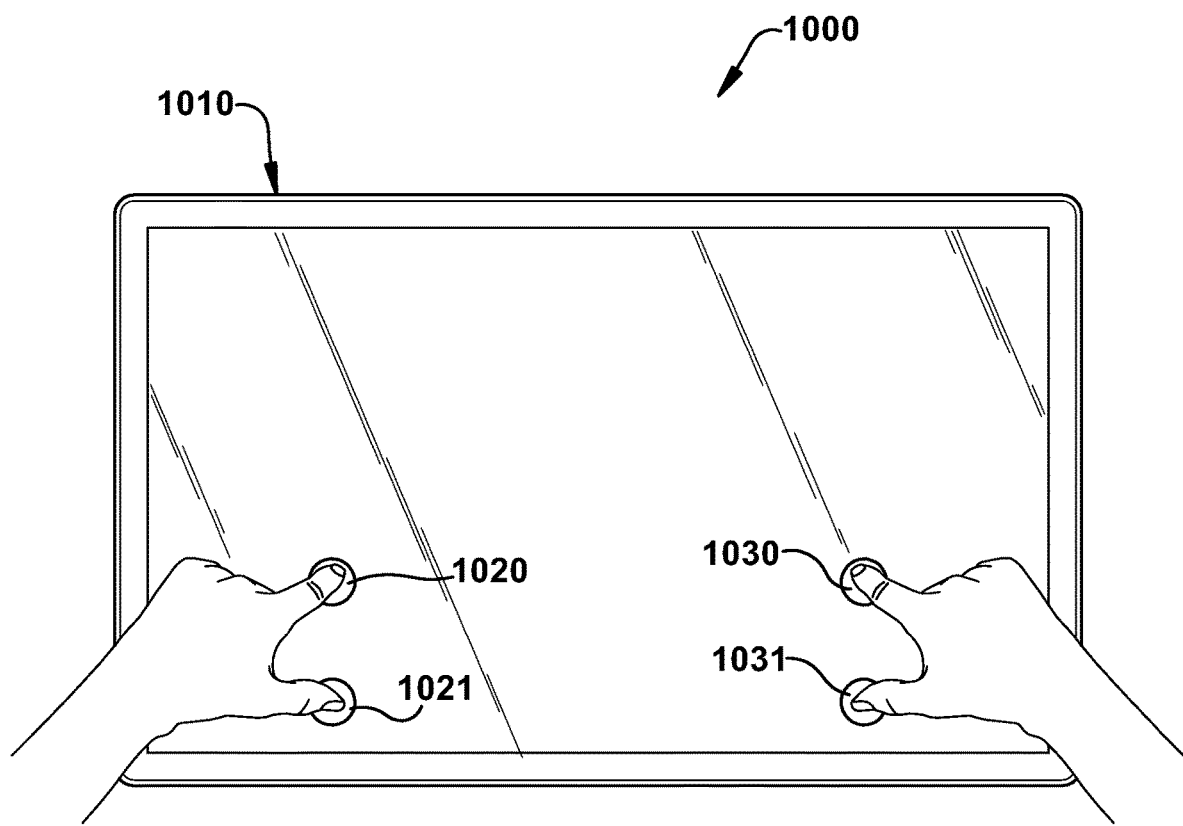
FIG. 10 illustrates a system using an exemplary interpolated variable impedance sensor array for gesture recognition.

The process may further be programmed to provide adjustment information to a coupled device based on the gesture, pattern, and/or pressure response. For example, as the user varies the pressure at two or more touch points in a see-saw gesture, the processor may adjust UI elements (such as brightness, magnification) accordingly. Additionally, the processor may cause the UI to scroll, fast forward, or reverse based on the based on the gesture, pattern, and/or pressure response. Additionally, using multiple touch points, the sensor array and processor may be configured to determine the relative orientation of fingers as well as the relative pressure allowing multi-dimensional input (e.g., scrolling in two dimensions). FIG. 10 illustrates an example 1000 in which a sensor array 1010 provides multi-dimensional input based on the relative location of touches and relative pressure of the touches. For example, the processor could be programmed to control horizontal scrolling based on the difference in pressure between points 1020 and 1030 or between points 1021 and 1031. Alternatively, the processor could be programmed to control horizontal scrolling based on some combination of the difference in pressure between points 1020 and 1030 and between points 1021 and 1031. Similarly, the processor could be programmed to control vertical scrolling based on the difference in pressure between points 1020 and 1021 or between points 1030 and 1031. Alternatively, the processor could be programmed to control vertical scrolling based on some combination of the difference in pressure between points 1020 and 1021 and between points 1030 and 1031.

In another embodiment, the processor is programmed to determine the continuous pressure change at one or more point on the sensor array and to cause the UI to provide visual one or more point. For example, a button on a touch screen may shrink or grow in proportion to the force applied. Such feedback may also include highlighting the active display regions and/or controls (e.g., showing a given 1:1 absolute mapping from part of the input surface to part of the display surface, a cursor, a highlighted/selected/active widget or region, etc.). For example, a remote-control touchpad may select an item, and then force manipulations and/or gestures cause an action with this item with continuous or discrete visual feedback showing the user what is happening to which object. Feedback may be applied via the cursor itself. For example, the system may tilt the cursor with tilt gestures or darken the cursor with greater force. Alternatively, the process may be programmed to cause the UI to provide audible and/or haptic feedback in proportion to the force applied. In one example, haptic or audible feedback helps the user know that the indirect manipulation is successful. For the various types of feedback accordingly, the system may provide continuous feedback varying in the form of duration, intensity, temperature, roughness, friction, surface texture, stiffness, mass/weight, pulse frequency/duration, pitch, timber, stereo and spatial sound position, clip blending, vowel, voice, combinations of these, etc. as well as discrete feedback.

In another embodiment, the processor is programmed to determine if the pressure applied at one or more points exceeds a threshold and then determine if the pressure at the one or more points falls below a second threshold and to cause the UI to provide feedback (e.g., visual, audio, and/or haptic) after the pressure at the one or more points falls below the second threshold. The magnitude (e.g., brightness, duration, size, amplitude) of the feedback may be based on the magnitude of the pressure (e.g., the amount the pressure exceeded the threshold, how quickly the pressure exceeded the threshold, and/or how quickly the pressure fell below the second threshold). In one example, the UI may provide a "springy" response that resembles a bounce back after the pressure at touch is released. In another example, the UI may open an item if the pressure on an icon corresponding to the item exceeds a threshold and may "de-commit" or stop opening the item if the pressure is released within or exceed a specified time or release rate. In one example, a hard push and release quickly may open the item, but a slow release would cause the item to slide back into closed state. In another embodiment, the feedback is a graphic effect where the image on the screen gets distorted when the user touches it (e.g., elastic-like deformation). Additionally, a touch may cast a virtual shadow in the UI.

The system can provide continuous response and user feedback and discontinuous response and user feedback. The system can provide continuous appearing feedback from a few grams of force to a high level of force (e.g. maximum voluntary contraction strength of a user), and the appearance of continuous motion may be defined as meeting the criteria of creating a Phi phenomenon or Beta movement illusion. Further, the ability to provide feedback from nearly zero grams force increases the discoverability of interaction, as users can use their intuition about the physical world and visual cues as they explore the interface to discover force-based interactions. The system may include feedback for hover, press, and/or drag as well as for amount of force with tilt, protrusion/depth, shadow, distortion, fill, transparency, peek, and viewport motion (pan, zoom, tilt, perspective).

With the continuous pressure sensing systems and methods disclosed herein, feedback may be provided proportionally to the amount of force applied to the sensor array. Accordingly, in one embodiment, the processor is programmed to cause the UI to provide feedback proportional to the pressure at the one or more touch points. For example, the UI may cause objects to start opening and continue opening with more pressure thereby providing visual feedback. And the UI could provide feedback (e.g., visual, audio, haptic) once the object is open. Further, the system may be adapted to use the touch pattern as an input. For example, a system may be adapted to determine a gesture for any part of the user's hand on a trackpad. The system uses the unique force image of a part of the hand (sometimes in relation to the pattern of the rest of the hand on the trackpad). Variations in pressure and location of a touch applied by the part of the hand are used as control signals. The system may also be configured to determine a touch pattern of multiple parts of a user's hand(s). Also, a pattern determined by the system can include a pattern of force variation or a pattern in time.

Figure 11:
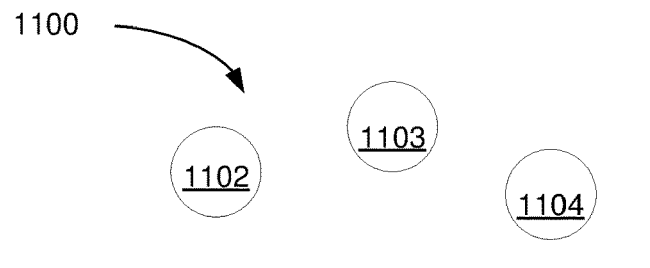
FIG. 11 illustrates examples of touch patterns for systems using exemplary interpolated variable impedance sensor arrays for gesture recognition.
Figure 11:
Figure 11:
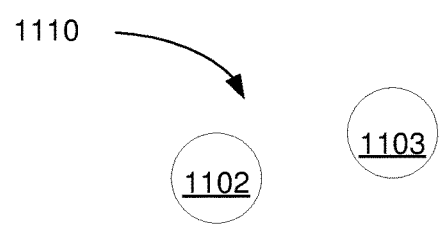
Figure 11:
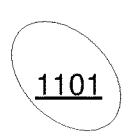
Figure 11:
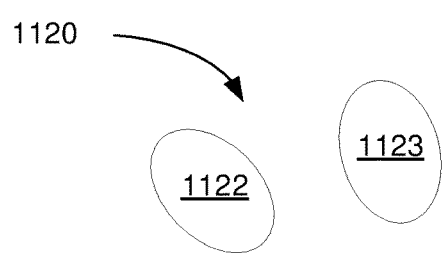
Figure 11:
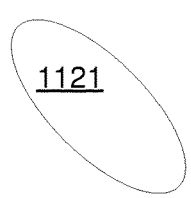

In another embodiment, the system uses a combination of (1) the touch pattern (the size, shape, and number) of the one or more points in contact with the sensor array instantaneously and/or over time together with (2) the pressure at the one or more touch points instantaneously and/or over time. The combination of these inputs is used to provide input to the processor and UI of a coupled device. FIG. 11 illustrates examples of how the touch pattern may change over time. At one instant, the touch pattern 1100 on a sensor array of a thumb 1101, index finger 1102, middle finger 1103, ring finger 1104, and pinky finger 1105 is shown. At another instant in time, the user may pick up the pinky finger 1105 and ring finger 1104 leaving a touch pattern 1110 distinct from the first. Similarly, the user may roll his or her fingers causing more surface of the fingers to be in contact with the sensor array creating a touch pattern 1120 with more elongated contact surfaces 1121, 1122, 1123. In some embodiments, the system is adapted to use the touch pattern of the palm of a hand as an input. For example, an increase in the force of a user's palm is an input that could be used alone and/or in combination with other touch patterns to initiate a command or function.

For example, one finger may apply a heavier force and another finger has a lighter force. The finger with the heavier force may be assigned to an action to hold an object and the finger with the lighter force may be assigned to move the background around the held object. In one application for instance, a user may press hard on a photo to select it and then use a light touch with another finger to move it around a map or gallery. In another example, the system uses the combination of force pattern at one or more locations with the changes in force patterns to determine motion such as rotation and/or the number of touch points (e.g., two fingers or three fingers).

Figure 12:
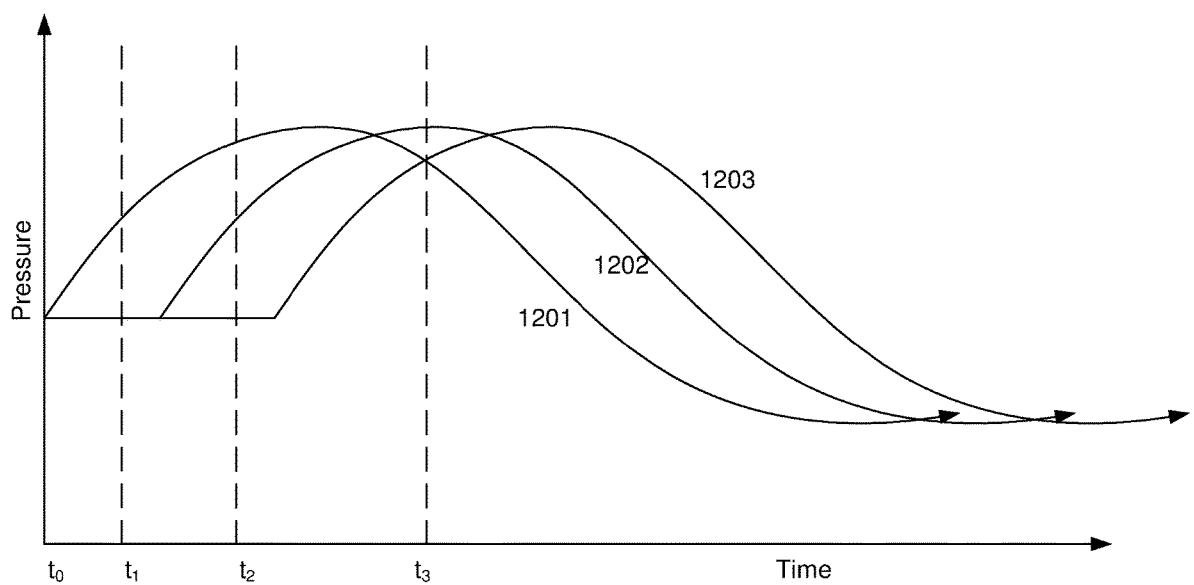
FIG. 12 shows exemplary pressure response curves for point sets in systems using exemplary interpolated variable impedance sensor arrays for gesture recognition.

FIG. 12 illustrates the pressure at the one or more touch points instantaneously and over time. In the example shown in FIG. 12, the three curves 1201, 1202, 1203 correspond to the thumb 1101, index finger 1102, and middle finger 1103 touch points in FIG. 11. In FIG. 12, the pressure at time to on each of the thumb 1101, index finger 1102, and middle finger 1103 touch points is approximately equal. Thereafter, the pressure on the thumb 1101 increases (as shown in curve 1201) while the pressure on the other two finger remains fairly constant. Accordingly, at time $t_1$, the pressure on the thumb has increased but the pressure on the other two fingers is about the same as at $t_0$. Thereafter, the pressure on the index finger 1102 increases and at time $t_2$, the pressure on the thumb 1101 and index finger 1102 is increased but the pressure on the middle finger is approximately the same as at $t_0$. Thereafter, the pressure on the thumb 1101 decreases and the pressure on the index finger 1102 and middle finger 1103 increase. At time $t_3$, the pressure at all three points is elevated over time $t_0$, but the pressure on the thumb 1101 is decreasing. As shown, the pressures on the three fingers rise and fall in sequence corresponding to a rolling or wave patter from the thumb 1101 to the index finger 1102 to the middle finger 1102. The systems disclosed herein may use a pressure patter such as that illustrated in FIG. 12 to provide input to the processor and UI of a coupled device. And the systems disclosed herein may use the combination of (1) the touch pattern (the size, shape, and number) of the one or more points in contact with the sensor array instantaneously and/or over time together with (2) the pressure at the one or more touch points instantaneously and/or over time to provide input to the processor and UI of a coupled device. And the systems disclosed herein may be configured to provide feedback (e.g., visual, audio, haptic) based on the combination of (1) the touch pattern (the size, shape, and number) of the one or more points in contact with the sensor array instantaneously and/or over time together with (2) the pressure at the one or more touch points instantaneously.

For example, the processor and UI may be configured to show a number of windows based on the pressure, number, and/or pattern of touches. And different fingers or body parts with varying levels of force can be used to create different actions in the UI. Various different input touches may include: knocking on a surface like a door, licking it, elbowing it, breathing on it, rolling a hand across it, laying a hand on it, sculpting it like clay, spiraling with progressive force, rubbing it by setting fingertips then moving arm, finger tapping from pinky to pointer, touching with knuckle (s), touching with elbow(s), touching with a phalanx (or phalanges), scratching (small area with high force). In one embodiment, the system uses the pressure pattern to determine the user has laid the side of the user's face on the interface (as if the user is laying down to sleep). The system may use that input to cause an associated action such as putting the device to sleep or otherwise changing its power state.

Figure 13:
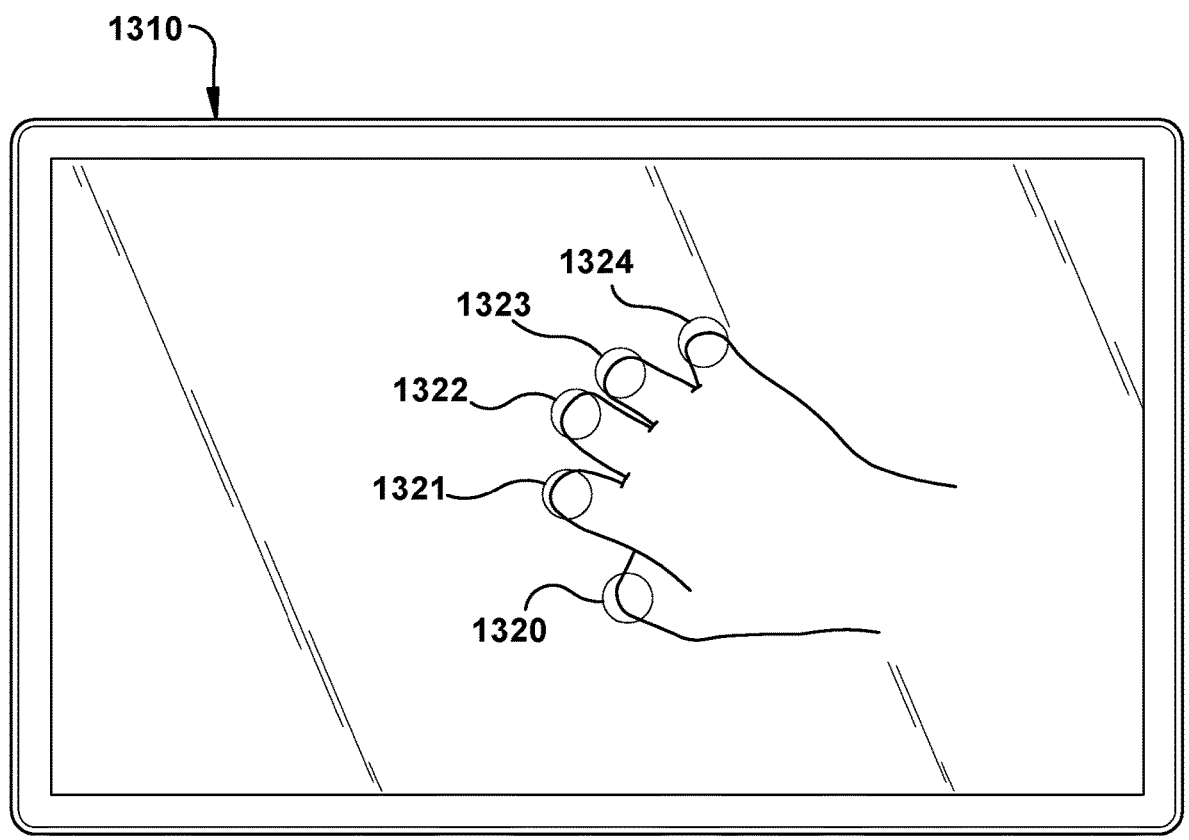
FIG. 13 illustrates a system using an exemplary interpolated variable impedance sensor array for gesture recognition.

In one example shown in FIG. 13, a user may rap on a touch interface of a device 1310 with one or more knuckles (e.g., like knocking on a door). The one or more knuckles make contact 1320, 1321, 1322, 1323, 1324 with the touch sensor array. A knock is high force tap. The system uses the high force characteristics to distinguish knocking from other touches. In one example, the knocking gesture may be used to control an interface mounted in a car, for example with a navigation application. One such gesture could re-center a navigation screen with one ore more knuckles or take the user to list of directions or let the user look ahead (e.g., at the next 15 minutes of driving) by zooming appropriately.

Additionally, a tapping or pounding gesture could be used for other commands such as those used in unusual situations. For example, these gestures could be used to dial 911 or dispatch emergency response (e.g., dial 911 if the user knocks on the screen three times within a given time period or if the user knocks or pounds on the device repeatedly).

Another example is a kneading pattern of multiple fingers pushing in and out with translating horizontally or vertically on the sensor array. Similarly, a wave pattern of four fingers touching the sensor array and using rolling amount of pressure without translating horizontally or vertically on the sensor array. Further, pressure with two fingers may correspond to one command but pressing harder on one or the other may correspond to a different command. In another example, the combination of (1) the touch pattern (the size, shape, and number) of the one or more points in contact with the sensor array instantaneously and/or over time together with (2) the pressure at the one or more touch points instantaneously may be used to activate different layers used in programs or visual layers in the UI.

Additional examples gestures include moving a thumb in a circle to undo, redo and/or zoom in and out. Such gestures enable a user to do as much as possible on device with one or both hands. Further, as described above, patterns with force can be used for additional gestures such as (1) with little force, a regular touch is applied and (2) with pressure, the user's gestures like circle scrolling, or swiping are caused to do different things. Also, a deep click may be linked to scroll and/or pan. The system may also detect the torque in finger motion and use that as a gesture input. In one example, a user's wavering motion in the finger is used to modulate the response (e.g., waver up and down (north to south) to change scroll direction). And in one example, while an item is selected, a swirling motion with one or more points in contact with the device may be used to delete the selected item.

Additionally, the disclosed systems are used to recreate existing device interactions. For instance, the user may place his or her hand on the sensor array as if holding a mouse. The hand movements on the sensor may be used to move the cursor. A tap from the index finger may correspond to a left click, and a tap from the middle finger may correspond to a right click. Multiple fingers together could move the scroll wheel.

Figure 14:
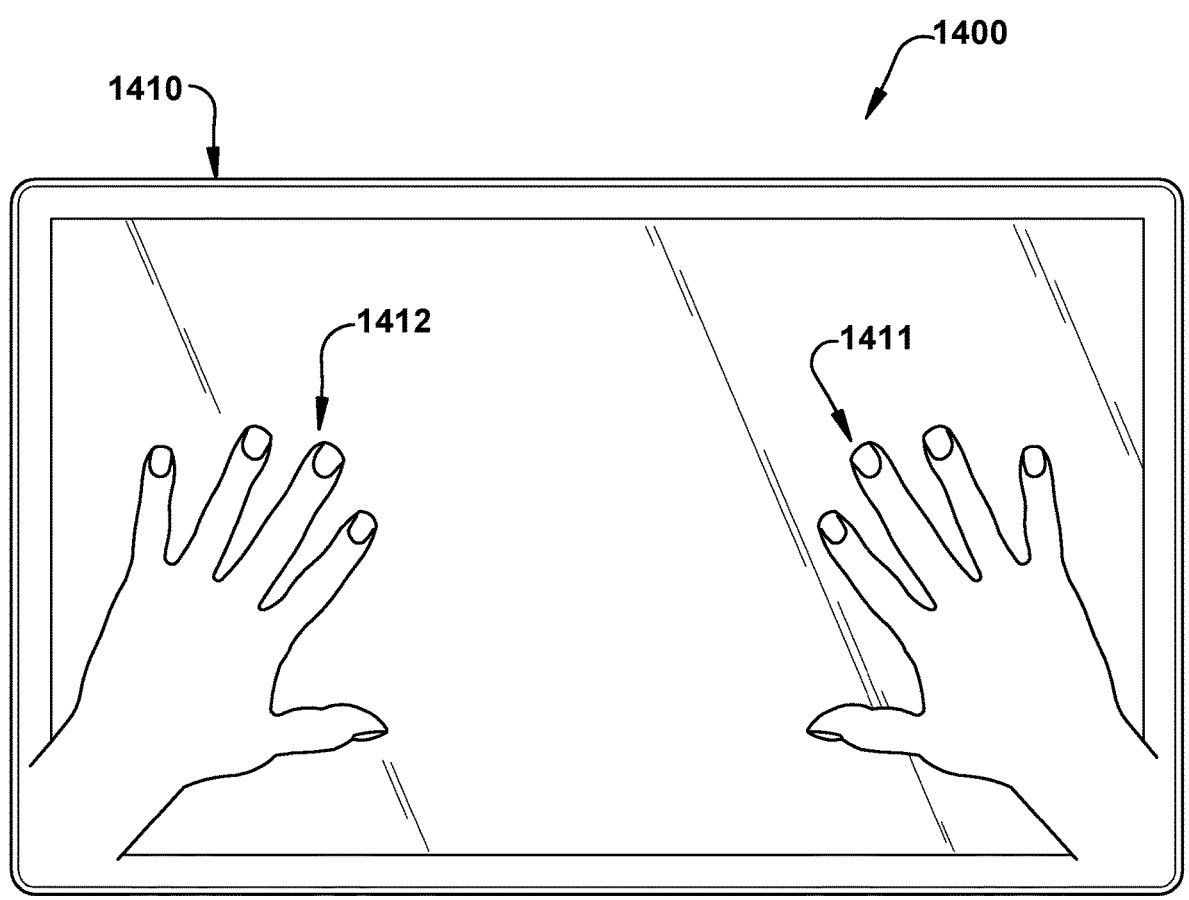
FIG. 14 illustrates a system using an exemplary interpolated variable impedance sensor array for gesture recognition.

Additionally, one or more of the surfaces of a device may be used as a pointing or typing input for the device (e.g., when both hands are placed on the interface) the device enters a typing mode). For example, FIG. 14 illustrates a touch surface 1410 that may enter a typing mode when a pattern corresponding to two hands 1411, 1412 are placed on the touch surface 1410. Additionally, the gesture input signals generated (including pattern and pressure) may be combined with signals from other sensors in the device (e.g., motion sensors, acoustic sensors) to determine corresponding gestures (e.g., a hard grasp combined with rapid falling may indicate a drop or a hard grasp with rapid shaking may correspond to a specific control signal). In some embodiments, when the system enters a typing mode, a virtual keyboard is displayed on a screen communicatively coupled to the touch surface 1410. The coupled display may be integral with the touch surface 1410 (e.g., a touch display) or it may be external to the touch surface 1410.

In one example, the touch surface is the surface of a laptop (A-, B-, or C-top surface). In an example in which the touch surface is integrated in the C-top of a laptop, placing fingers in a touch pattern (e.g., a standard typing hand arrangement) on the surface causes the surface to display a virtual keyboard. The surface may also change to other interfaces based on the touch pattern on the touch surface (touching the touch surface with a hand in a shape used for a physical computer mouse would cause a virtual mouse or cursor to be displayed or holding a hand in a writing position would cause a virtual pen or stylus to be displayed). Alternatively, the laptop may display the virtual keyboard on the B-top display integrated in the laptop. The virtual keyboard may provide visual feedback by illuminating each key as it is touched the virtual keyboard.

In one embodiment, a touch surface system is adapted to determine patterns of objects placed on the touch surface. For example, a touch surface on a countertop may determine the touch pattern of objects placed on the countertop. In one example, the touch pattern caused by certain type of plate or bowl causes a scale to appear on an integrated or external display showing the corresponding weight. Similarly, the touch surface system may be adapted to determine the touch pattern of other objects with pre-determined shapes, for example, circles or stars or squares. The touch surface system is adapted to determine the touch pattern created by the shapes under their own weight when placed on the touch surface and/or when additional pressure is applied to the shapes. The system is adapted to cause a specific function or control based on the touch pattern corresponding to each shape. The system may be adapted to respond to touch patterns of other objects such as beverage bottles or cans. And as the pressure pattern changes over time, the system may be adapted to change control signals. In some embodiments, special objects or tools are provided to the user. In other embodiments, the touch pattern of objects is programmed into or learned by the system. In that way, users may program function(s) to one or more object or combination of objects.

The touch surface may be adapted to respond to touch patterns differently based on the area of the touch surface in which the touch pattern is located. For example, areas around an object (for which the touch pattern is recognized) on the surface may get special interactive meanings. For example, if a user puts down a pencil and touches on the left side of the touch surface, color controls are activated. And if the user puts down the pencil and touches the right side of the touch surface, dimensional controls are activated. As with other embodiments, the touch surface may be integrated with a display such that the controls are displayed at a specific location on the display (e.g., at the point the user touches after putting down the pencil).

Figure 15:
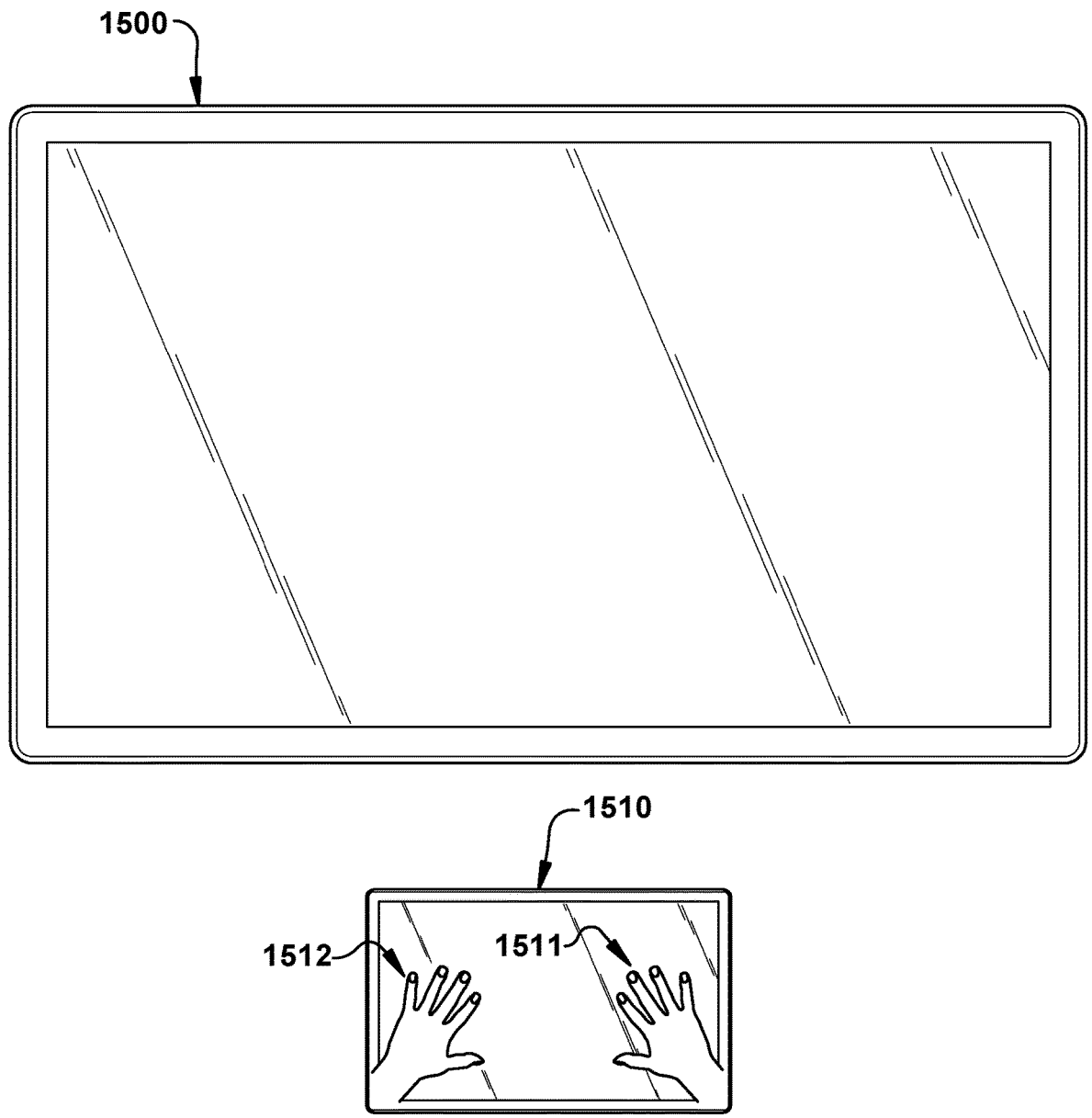

FIG. 15 illustrates an example in which a touch surface 1510 is used to control a remote display 1500. The touch surface 1510 may also comprise a display of its own. As discussed above, one example is that of the touch surface 1510 being the C-top surface of a laptop and the display 1500 being the B-top display of a laptop. In one embodiment, the touch surface 1510 has specific controls (e.g., a keyboard, piano) in which the system is context aware. When the user is editing a text field, the system should display appropriate keyboard on the display 1500 or display integrated into the touch surface 1510. When a user is in a piano or music application, the system displays piano keys on the display 1500 or display integrated into the touch surface 1510. When the user is in a video editing app, the system displays a specific control for video editing on the display 1500 or display integrated into the touch surface 1510. Additionally, users can create their own custom control panels for each application.

In some embodiments, user interaction with the touch surface 1510 is used to open applications and/or unlock applications. For example, gesture of turning, pushing and/or pulling (like turning a knob to open a door) corresponds to opening or closing an application. Additionally, touch force patterns can be used to lock and/or unlock devices and/or applications.

Moreover, the interpolated variable impedance touch sensor arrays may be used to detect pressure patterns that may damage the device. Using this input, the system may alarm if a user acts in a way that would damage the device. And the system may detect when the device is bent and/or under strain.

The gestures described can be used for multiple controls as described above and including (but not limited to) switching applications, going to a home screen, applying custom presets, going back, going forward, zooming, operating the camera (e.g., using side pressure input to make selfies and pictures easier), changing volume, and/or changing brightness.

Figure 16:
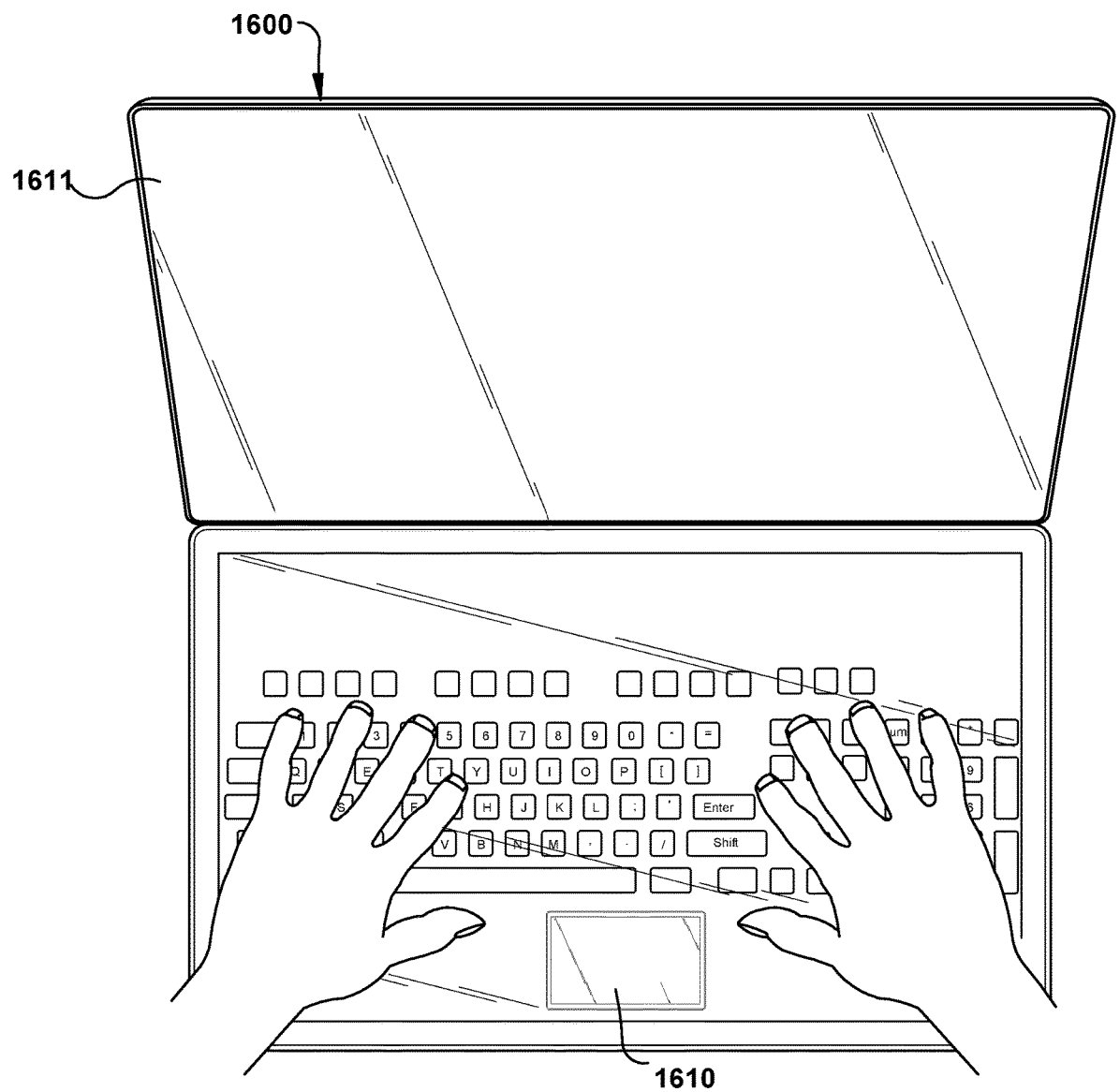
FIG. 16 illustrates a system using an exemplary interpolated variable impedance sensor array.

FIG. 16 shows a laptop 1600 with a trackpad 1610 incorporating an exemplary interpolated variable impedance touch sensor array. As discussed above, in some embodiments, a laptop 1600 may include one or more touch surfaces, including in which the touch surface is the surface of a laptop (A-, B-, or C-top surface). In an example in which the touch surface is integrated in the C-top of a laptop, placing fingers in a touch pattern (e.g., a standard typing hand arrangement) on the surface causes the surface to display a virtual keyboard. In the example shown in FIG. 16, the trackpad 1610 is incorporated as shown.

In the illustrated example and with many conventional laptops, space is limited for the trackpad 1610. Accordingly, it is advantageous to use the space allotted for the trackpad 1610 efficiently. In one example, the interpolated variable impedance touch sensor array trackpad 1610 is for one hand use and is primarily designed for use with the pointer finger and thumb of one hand. A sample gesture for this configuration is rotating the pointer and thumb around each other to cause the associated command (e.g., rotating an object on the screen 1611).

The additional dimensions of force enabled by the interpolated variable impedance touch sensor arrays make small trackpads 1610 more useful by providing for more input combinations in the small area provided. In one example, the magnitude of the force applied at one or more points on the trackpad 1610 is used as a control signal for the laptop 1600. For example, the magnitude of the force applied could control the speed of scrolling or moving the cursor. A light touch on the trackpad 1610 may cause the computer to move the cursor faster, whereas applying more pressure may enable finer-grain control. Additionally, the cursor could begin to move more slowly or more quickly when the trackpad senses a higher force (for precision selection). In some examples, the trackpad 1610 act like a hybrid of trackpad-style and trackpoint-style input device. The trackpad 1610 has the freedom of motion of a trackpad (and the ability to click and point with one finger), but the compactness of a trackpoint. The system may incorporate different modes based on the magnitude of the applied force such as a deep (hard) click corresponds to a fast mode with an additional click enabling a precision mode. Other combinations of force gestures as described above may be used to enable and/or change modes. Similarly, the force applied can change the speed or change the volume and speed in application such as text to speech applications.

To further utilize the space available on the trackpad 1610, the location of the force interaction on the trackpad 1610 may be an additional input. For example, a hard press on the left edge of the trackpad 1610 may correspond to a command (e.g., go to the previous app.). And a hard press on the right edge of the trackpad 1610 may correspond to a command (e.g., go to the next app.). Further, a hard press on the top may correspond to a command (e.g., show all apps.). Similarly, a hard press on the bottom may correspond to a command (e.g., to left or right click (as usual)).

The interpolated variable impedance touch sensor array in the trackpad 1610 also enables force continuation for both scrolling and pointing. For example, if a user reaches the edge of the trackpad (or is within a threshold distance of the edge) while moving the cursor, the system uses the force inputs to determine what to do. For example, if the user applies more pressure after reaching the edge of the trackpad 1610, the system may cause the cursor to continue moving in the last trajectory or switch to a "trackpoint mode" in which the user can continue to move the cursor without moving his or her finger a substantial amount. This system could help significantly with click-and-drag commands.

In addition to the magnitude of the applied force at one or more points acting as an input (e.g., to control speed), the force may be used to "lock" a drag mode on (for dragging an object on the screen 1611). For example, a touch can be used for scrolling and navigation after a force touch (exceeding a certain threshold) is received and then a second force touch (exceeding a certain threshold the same or different from the previous threshold) may be used to disable or "unlock" the drag mode. The system may provide visual feedback (e.g., a lock icon around the pointer) when the specific modes are enabled. With editing like photo editing, the system allows a crop mode using the trackpad 1610 by a drawing gesture with a force pattern with one or more fingers. Additionally, the magnitude of a force touch on the touchpad 1610 may be used a control input to indicate the user's reaction (positive or negative) to something displayed on the screen 1611 or an action the laptop 1610 takes. For example, a user may push hard on the trackpad 1610 in reaction to things the user likes and lightly in reaction to things the user does not like. For example, in reaction to a profile in a dating application, the user could indicate his or her reaction with the magnitude of the force touch. Similarly, the system may use force patterns over time to determine the user's reaction. For example, a lightly drawn smiley face pattern may indicate mild approval where a heavier drawn smiley face indicates more approval. The same could be applied with gestures like a sad face in which the magnitude of the force correlates to the level of displeasure.

The system also may use the magnitude of the force touch to select which menus appear. For example, a first force pattern may pull up a primary menu and a second force pattern may select from the menu or navigate through the menu. And as disclosed, the magnitude of the force may be an input such that a combination of light tap followed by a hard tap is one input and a hard tap followed by a light tap is a separate input. Additionally, a detected pressure pattern may correspond to the command to move the cursor to the nearest control.

The system may use special gestures for trackpads 1610 such as a zigzag gesture. In one example, the touch pattern is a zigzag gesture moving up and down on the trackpad 1610. The system uses the magnitude of the force touch at various portions of the gesture pattern. For example, a light force throughout the pattern may correspond to one command whereas a heavy force throughout may correspond to another command. Similarly, combinations of forces throughout the gesture and the variation of force may be used to determine specific force patterns to correlate to specific commands. The zigzag force pattern gesture may be used for commands such as initiating a music player, a video game, a favorite website, plays a sound, etc. Other gestures that have real-word connotations may also be used. For example, a diagonal swipe on the trackpad 1610 (in a painting gesture) may (based on the pressure pattern applied) correspond to filling an area with color or erasing an area or clearing all windows off a screen. Similarly, a whole hand swipe gesture may be used to clear all windows where the user lays a hand flat on the trackpad 1610 and swipes left or right. This gesture is advantageous because it is easier for the system to distinguish than a single finger gesture. Further, swiping left and right could have different meanings.

Further, the system may be adapted to use the touch pattern of the thumb(s) as an input. For example, a system may be adapted to determine a gesture for the side of a user's thumb on a trackpad 1610. The system uses the unique force image of a thumb (sometimes in relation to the pattern of the rest of the hand on the trackpad 1610). Variations in pressure and location of a touch applied by the thumb are used as control signals. For example, a thumb touch could cause all the windows to pop up (similar to alt-tab in a Windows operating system), and the amount of pressure in the applied thumb pressure could cause the system to scroll through the open programs (e.g., move forward by busing harder than the initial thumb touch). The system may also be configured to determine a touch pattern of both of a user's thumbs. For example, swiping both thumbs on the trackpad 1610 may correspond to a scroll based on the direction of the swipe. And a hard-quick touch of the thumb could be used for an editing feature such as incremental selection or deletion.

As an alternative to thumbs, the system can also detect the flat part of fingers. If a user lays his or her flat on the trackpad 1610, that is a unique gesture corresponding to a command.

The interpolated variable impedance touch sensor array may be used for diagnostics of the trackpad 1610. The system may record the actions on a trackpad and use the pressure and pattern information for diagnostics. The system may record the area(s) touched and/or the sharpness of the force being applied over time. If there is a change or degradation in the force and/or patterns input over long periods of time, the system can use this also to compensate for and/or detect failures.

Additionally, the interpolated variable impedance touch sensor array may be used for security with the trackpad 1610. For example, the system may determine a touch pattern (e.g., dot/dash Morse Code-type pattern) input on the trackpad 1610. This force input and/or touch pattern may be used to lock or unlock the laptop 1600 or applications or functions on the laptop. In some examples, the combination of rhythm, number of touches, force, and location are used to create unique touch patterns corresponding to strong "passwords" to access the laptop 1600 and/or applications using the laptop 1610.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A laptop touchpad system for detecting a continuous pressure curve for a touch comprising:
    a plurality of physical variable impedance array (VIA) columns connected by interlinked impedance columns;
    a plurality of physical VIA rows connected by interlinked impedance rows;
    a plurality of column drive sources connected to the interlinked impedance columns and to the plurality of physical VIA columns through the interlinked impedance columns;
    a plurality of row sense sinks connected to the interlinked impedance rows and to the plurality of physical VIA rows through the interlinked impedance rows; and
    a processor configured to interpolate the continuous pressure curve in the physical VIA columns and physical VIA rows from an electrical signal from the plurality of column drive sources sensed at the plurality of row sense sinks.

2. The system of claim 1 wherein the processor is configured to detect two or more touches at a first time, determine that the two or more touches at the first time are arranged in a pattern corresponding to a predetermined gesture, determine a relative pressure between the two or more touches from the electrical signal from the plurality of column drive sources sensed at the plurality of row sense sinks, and associate the continuous pressure curve with a user interface (UI) element, the UI element accepting an adjustment input based on the relative pressure between the two or more touches, and provide a confirming input to the UI element based on the relative pressure between the two or more touches.

3. The system of claim 2 wherein the processor is configured to determine a pressure response from the electrical signal from the plurality of column drive sources sensed at the plurality of row sense sinks.

4. The system of claim 3 wherein the processor is configured to provide adjustment information to a coupled laptop based on a location of the pattern corresponding to the predetermined gesture and pressure response.

5. The system of claim 1 wherein the processor is configured to resize a user interface (UI) element proportionally to the continuous pressure curve.

6. The system of claim 1 wherein the processor is configured to determine that the touch is a high force tap corresponding to a knuckle tap from the continuous pressure curve.

7. The system of claim 1 wherein the processor is configured to determine that the touch is a kneading pattern of multiple fingers pushing in and out with translating horizontally or vertically on the sensor array from the continuous pressure curve.

8. The system of claim 1 wherein the processor is configured to detect two or more touches at a first time and determine a relative pressure between the two or more touches from the electrical signal from the plurality of column drive sources sensed at the plurality of row sense sinks.

9. The system of claim 1 wherein the processor is configured to determine a relative orientation of a plurality of fingers from the electrical signal from the plurality of column drive sources sensed at the plurality of row sense sinks and a relative pressure applied by the plurality of fingers from the electrical signal from the plurality of column drive sources sensed at the plurality of row sense sinks.

10. The system of claim 1 wherein the processor is configured to determine a continuous pressure change at one or more points on the sensor array from the electrical signal from the plurality of column drive sources sensed at the plurality of row sense sinks and to cause a user interface (UI) element to provide visual feedback based on the continuous pressure at the one or more points.

11. The system of claim 1 wherein the processor is configured to determine a pattern of touches of one or more points in contact with the sensor panel instantaneously or over time and to determine a pressure at the one or more points in contact with the sensor panel instantaneously or over time.

12. A method for receiving an adjustment gesture formed on or about a plurality of sensor panels on a plurality of faces of a device comprising:
- detecting two or more touches at a first time at the plurality of sensor panels;
- determining that the two or more touches at the first time are arranged in a pattern corresponding to a predetermined gesture;
- determining a relative pressure between the two or more touches;
- associating the predetermined gesture with a user interface (UI) element, the UI element accepting an adjustment input based on the relative pressure between the two or more touches; and
- providing an input to the UI element based on the predetermined gesture and relative pressure between the two or more touches.

13. The method of claim 12 wherein each of the plurality of sensor panels comprise:
- a plurality of physical VIA columns connected by interlinked impedance columns;
- a plurality of physical VIA rows connected by interlinked impedance rows;
- a plurality of column drive sources connected to the interlinked impedance columns and to the plurality of physical VIA columns through the interlinked impedance columns;
- a plurality of row sense sinks connected to the interlinked impedance rows and to the plurality of physical VIA rows through the interlinked impedance rows; and
- a processor configured to interpolate a location of the predetermined gesture in the physical VIA columns and physical VIA rows from an electrical signal from the plurality of column drive sources sensed at the plurality of row sense sinks.

14. The method of claim 13 wherein the processor is configured to resize a user interface (UI) element proportionally to the relative pressure between the two or more touches.

15. The method of claim 13 wherein the processor is configured to determine that the two or more touches are high force taps corresponding to knuckle taps.

16. The method of claim 13 wherein the processor is configured to determine that the two or more touches are a kneading pattern of multiple fingers pushing in and out with translating horizontally or vertically on the sensor array.

17. The method of claim 13 wherein the processor is configured to determine a pressure response from the electrical signal from the plurality of column drive sources sensed at the plurality of row sense sinks.

18. The method of claim 17 wherein the processor is configured to provide adjustment information to a coupled laptop based on the location of the predetermined gesture and pressure response.

19. The method of claim 12 wherein the processor is configured to determine a pattern of touches of one or more points in contact with the plurality of sensor panels instantaneously or over time and to determine a pressure at the one or more points in contact with the sensor panel instantaneously or over time.

20. A method for receiving an adjustment gesture formed on or about a plurality of sensor panels on a plurality of faces of a laptop, the method comprising:
- detecting two or more touches at a first time at the plurality of sensor panels;
- determining that the two or more touches at the first time are arranged in a pattern corresponding to a predetermined gesture;
- determining a relative pressure between the two or more touches;
- associating the predetermined gesture with a user interface (UI) element of the laptop, the UI element accepting an adjustment input based on the relative pressure between the two or more touches.

* * * * *